(12) United States Patent
Shipman

(10) Patent No.: US 7,774,845 B2
(45) Date of Patent: Aug. 10, 2010

(54) COMPUTER SECURITY SYSTEM

(75) Inventor: Robert A Shipman, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 1267 days.

(21) Appl. No.: 10/495,165

(22) PCT Filed: Nov. 6, 2002

(86) PCT No.: PCT/GB02/04998

§ 371 (c)(1),
(2), (4) Date: May 11, 2004

(87) PCT Pub. No.: WO03/046699

PCT Pub. Date: Jun. 5, 2003

(65) Prior Publication Data

US 2005/0022014 A1      Jan. 27, 2005

(30) Foreign Application Priority Data

Nov. 21, 2001     (EP) ................................ 01309795

(51) Int. Cl.
*H04L 9/00*     (2006.01)
(52) U.S. Cl. .................... 726/23; 726/22; 713/161; 713/168; 380/255; 380/2
(58) Field of Classification Search ............. 713/201; 380/225, 2; 726/23
See application file for complete search history.

(56) References Cited

U.S. PATENT DOCUMENTS 5,440,723 A * 8/1995 Arnold et al. ............. 714/2
5,621,889 A * 4/1997 Lermuzeaux et al. ...... 726/22
5,633,931 A * 5/1997 Wright ..................... 713/161

(Continued)

FOREIGN PATENT DOCUMENTS

WO          WO 01/71499          9/2001

(Continued)

OTHER PUBLICATIONS

Zenkin, "Fighting Against the Invisible Enemy—Methods for detecting an unknown virus", Computers & Security. International Journal Devoted to the Study of Technical and Financial Aspects of Computer Security, Elsevier Science Publishers, Amsterdam, NL., vol. 20, No. 4, Jul. 31, 2001, pp. 316-321.

(Continued)

*Primary Examiner*—Kambiz Zand
*Assistant Examiner*—Yonas Bayou
(74) *Attorney, Agent, or Firm*—Nixon & Vanderhye P.C.

(57) ABSTRACT

A computer security system for use in a network environment comprising at least a plurality of user computers arranged to communicate over a network, the system comprising a warning message exchange system operable to allow the communication from the user computers of warning messages relating to suspect data identified as a possible security threat; a message counting system operable to maintain a count for every particular piece or set of suspect data based on the number of warning messages communicated relating thereto; and network security means operable to act against any particular piece or set of suspect data for which the count maintained therefor exceeds at least one threshold value.

37 Claims, 11 Drawing Sheets

U.S. PATENT DOCUMENTS

| | | | | |
|---|---|---|---|---|
| 5,638,446 | A | * | 6/1997 | Rubin .......................... 705/51 |
| 5,926,549 | A | * | 7/1999 | Pinkas ....................... 713/168 |
| 6,023,723 | A | * | 2/2000 | McCormick et al. ........ 709/206 |
| 6,144,739 | A | * | 11/2000 | Witt et al. ...................... 380/2 |
| 6,157,721 | A | * | 12/2000 | Shear et al. ................. 380/255 |
| 6,330,588 | B1 | * | 12/2001 | Freeman ..................... 709/202 |
| 6,725,377 | B1 | * | 4/2004 | Kouznetsov ................. 726/23 |
| 6,944,673 | B2 | * | 9/2005 | Malan et al. ................ 709/237 |
| 7,023,723 | B2 | * | 4/2006 | Daughton et al. ........... 365/158 |
| 7,089,303 | B2 | * | 8/2006 | Sheymov et al. ............ 709/224 |
| 7,278,159 | B2 | * | 10/2007 | Kaashoek et al. ............. 726/22 |
| 7,308,714 | B2 | * | 12/2007 | Bardsley et al. .............. 726/23 |
| 7,370,358 | B2 | * | 5/2008 | Ghanea-Hercock .......... 726/23 |
| 2003/0041126 | A1 | * | 2/2003 | Buford et al. ............... 709/220 |
| 2004/0073617 | A1 | * | 4/2004 | Milliken et al. ............. 709/206 |

FOREIGN PATENT DOCUMENTS

WO      WO 01/71499 A1     9/2001

OTHER PUBLICATIONS

Zenkin, "Fighting Against the Invisible Enemy—Methods for Detecting an Unknown Virus", Computers & Security, International Journal Devoted to the Study of Technical and Financial Aspects of Computer Security, Elsevier Science Publishers, Amsterdam, NL, vol. 20, No. 4, Jul. 31, 2001, pp. 316-321, XP004254268.

Kephart, "A Biologically Inspired Immune System for Computers", Nov. 2001.

Symantec, "The Digital Immune System", 2001.

* cited by examiner

COMPUTER SECURITY SYSTEM

This application is the US national phase of international application PCT/GB02/04998 filed 6 Nov. 2002 which designated the U.S. and claims benefit of EP 01309795.1, dated 21 Nov. 2001, the entire content of which is hereby incorporated by reference.

TECHNICAL FIELD

The present disclosure relates to a computer security system for use in a networked environment, the system providing a measure of security against suspect data such as computer viruses and the like.

BACKGROUND TO THE INVENTION

Malicious attacks on computer systems have plagued individuals and organisations for many years. Initially these attacks mostly took the form of viruses in which a rogue program infected a machine via an infected floppy disk or network location for example. More recently so called worms and Trojan horses have caused much disruption in which the user is deceived into running a program via an attachment to an e-mail or a rogue program masquerading as something more innocuous. A large industry has grown up around protection from such attacks. These companies provide anti-virus software that typically resides on individual machines and monitors the system to check for the presence of known viruses. These viruses can take many forms—some more advanced forms are fully polymorphic in that the byte code "signature" is entirely different from one instance of the virus to the next. This is achieved through the use of encryption technology and/or the addition of spurious and random code to the virus. However, the majority of viruses that are in the "wild" and the cause of costly disruption to computer systems are relatively simple and can be detected by simple byte-code signature matching. Many of the current anti-virus programs use just such techniques and are successful if the signature of a discovered virus can be delivered to machines before the virus strikes.

The operation of such anti-virus programs and systems is well known in the art, and is usually as follows. A computer user will have installed on their computer an anti-virus program which is provided with a database of known computer virus byte-code signatures. The program will tend to run in the background continuously monitoring operations performed on the computer, and data received at and transmitted from the computer. If the byte-code signature of a known virus stored in the anti-virus program's database is detected by the program, the anti-virus program informs the user and takes appropriate action against the data, such as deleting it or storing it in a protected drive.

Such prior approaches tend to suffer from a big problem, however—delay. Even the simplest of viruses and worms may still cause great disruption at enormous cost to organisations. This is because the process from discovery of a new virus to delivering its signature to all protected machines takes too long, and requires an administrative authority such as the anti-virus program manufacturer (or in some cases an organisation's IT department) to recognise the problem, take action to identify the virus's signature, update the anti-virus database, and distribute the updated database to each user. By the time such a sequence of actions is complete the damage has already been done in many cases. What is required is a much more rapid approach—one that can operate on the same time scales as the spread of the virus and thus provide much more rapid and cost-saving protection.

Other problems can be caused by the receipt of so-called "spam" email messages, which are unsolicited messages sent to a list of recipients usually advertising a product or service, or frequently including pornography. The receipt of large amounts of "spam" is analogous to a denial of service attack, in that the spam messages can fill an email in-box to the extent that the box no longer has any capacity to receive legitimate messages.

PRIOR ART

There is much work exploring the use of agent technology to provide rapid reaction to malicious attack. In this work computer systems are inhabited by a number of agents whose job it is to detect intrusions. One interesting approach aims to draw metaphor from immune systems, which allow an organism to rapidly respond to previously unseen foreign objects through a "real-time" evolutionary system, as disclosed in Artificial Life IV, Proceedings of the Fourth International Workshop on Synthesis and Simulation of Living Systems, Rodney A. Brooks and Pattie Maes, eds., MIT Press, Cambridge, Mass., 1994, pp. 130-139 These kinds of agent systems may prove useful in future security systems, but rely on the successful development and deployment of software agents which can detect intrusions. Many other potential future anti-virus systems are also discussed at http://www.research.ibm.com/antivirus/SciPapers.htm. In the meantime until the potential of these ideas is exploited, there is still a need for a system which allows for more rapid prevention of the spread of computer viruses.

One such prior art system which claims to increase response times is that of the Symantec® Digital Immune System (DIS), which is described at http://securityresponse.symantec.com/avcenter/reference/dis.tech.brief.pdf. The DIS operates by providing an heuristic search engine which automatically identifies possible viruses at either the user's desktop, the server, or the network gateway. A secure channel is then provided direct to Symantec's security response centre over which the suspect data can be transmitted. At the security response centre the received data is subject to a number of automatic filters to detect, for example, known clean files, files which are known to return false positives from the heuristic search engine, and known virus files. If the suspect data is not filtered out by any of these filters then it is directed to an analysis program for further analysis and action.

The DIS system therefore allows for the automatic identification, secure submission, automatic prioritisation, and subsequent analysis of suspect data, but ultimately still involves a central authority in the loop to analyse suspect files which make it through the filters. Thus, whilst DIS may improve response times to virus infection through it's automatic filtering processes, it still relies on a central authority to analyse the suspect data and decide on appropriate action, which must then be communicated outwards to each user. There is therefore still a need for a system which removes this centralised analysis step to speed the response.

SUMMARY OF THE INVENTION

In order to address the above problems, one or more disclosed embodiments provide a collaborative computer security system wherein the responsibility for detection of malicious data such as a computer virus or email address from which spam messages have been received is removed from that of any central authority, and is instead placed in the hands of each and every user of the network. More particularly, the disclosed embodiments provide a distributed virus or other malicious data identification system which allows individual users or software agents running on a user's computer to identify malicious data when they receive it, and to pass a warning message concerning the received data to either their peers, or to a central server. A record is kept either at the server or at each peer computer as to the number of warning messages communicated concerning any particular piece or set of suspect data, and then appropriate security actions such as issuing warnings to users or blocking the transmission of the suspect data can be taken once the number of warning messages communicated from users has passed a certain threshold level. The advantages are that an organisation's response to a computer virus intrusion can be much more rapid than was previously the case where a central authority had to identify the problem and take action. Similarly, where spam email messages are being received, the address of the sender can be identified and blocked by the users acting collaboratively.

In view of the above, the disclosed embodiment(s) provide a computer security system for use in a network environment comprising at least a first group of user computers arranged to communicate over a network, the system comprising a warning message exchange system operable to allow the communication from the user computers of warning messages relating to suspect data identified as a possible security threat; a message counting system operable to maintain a count for every particular piece or set of suspect data based on the number of warning messages communicated relating thereto; and network security means operable to act against any particular piece or set of suspect data for which the count maintained therefor exceeds at least one threshold value.

One advantage of the disclosed embodiment(s) is that it allows the security system to work on the same time scales as the spread of the attack. The more the computer virus or worm spreads the more likely it is that enough positive identifications are made to allow its signature to be ascertained and protection to be installed. This overcomes the problem of traditional security systems where an authority has to learn of the virus, take action, and then distribute associated protective measures to the users.

A further advantage of the system is that it allows a lot of information to be rapidly collected about a computer virus. For example, current "worms" that are "in the wild" are mostly identical at the byte code level, however it is likely that in the future this will no longer be the case, and that there will be variations in different instances of the same worm. In such a case, the more instances of the worm that can be collected the more likely that it will be that suitable protection can be devised. By allowing for individual identification of a worm at each computer by the user, the disclosed embodiment(s) allow for multiple instances of the same virus to be identified and collected.

The suspect data may take any form, but data such as computer viruses, macros, or other executables are particularly envisaged. Alternatively, the suspect data may be, for example, an email address or other network address from which malicious messages or other data has been received. In the description of the embodiments to be made later herein, alternative embodiments may be provided by considering the suspect data or computer viruses mentioned therein as email address or network address data of addresses from which a user has received spam messages.

The one or more "threshold values" against which the respective counts for pieces or sets of suspect data are compared may be any value (including zero), and may be fixed or dynamically adaptive. Furthermore the actual values may be generated by any appropriate function, such as for example by a random number generator, or as a function of some metric of accuracy of users in identifying viruses. Furthermore, in other embodiments it is foreseen that the threshold values may not simply be actual numbers which the respective counts must be greater than, but could instead be probabilistic in nature. Furthermore, various logical functions or rules can be used for their creation, including for example, fuzzy logic.

Preferably, the judgement as to whether any piece or set of data present at any one or more of the user computers is a possible threat is performed by the respective human user or users of the or each user computer. Such an arrangement exploits the massive untapped resources and expertise of many computer users, and again allows for a rapid response to the spread of a computer virus.

Preferably, the network security means is further operable to compare the maintained count for a particular piece or set of suspect data against a plurality of different thresholds, and to take different action against the data dependent upon which threshold or thresholds are exceeded.

Such an approach allows the computer security systems to have a graded response to a computer virus intrusion, and to take different actions depending on the number of warnings received from users. Furthermore, it is also possible to weight warnings from different users, such that a warning from a user who is particularly expert in the field is weighted more heavily than a casual user of the system.

Preferably, the action taken by the network security means comprises warning each of the users as to the suspect nature of a particular piece or set of data. Furthermore, the action may also comprise preventing the transmission of the particular piece or set of suspect data across the network. Usually, the warning action will be taken when the number of messages communicated exceeds a lower threshold than a second threshold which must be crossed in order for the transmission blocking action to take place.

Preferably, each warning message comprises at least an identifier of the piece or set of suspect data to which it relates. The identifier may be the actual piece or set of suspect data itself, or a repeatably generatable signature substantially unique to the piece or set of data. By allowing for the collection of such identifiers, the security system also provides a means of collecting information on multiple computer viruses, and also on adaptive computer viruses whose byte code signature may change in each instantiation on a users machine.

In a preferred embodiment, the computer security system further comprises a network server arranged to receive each warning message communicated from the user computers, and further arranged to host the message counting system and at least part of the network security system, wherein that part of the network security system hosted by the server is operable to determine the action which should be taken against a particular piece or set of suspect data, and to communicate an action condition indicator indicative of the determined action to each of the plurality of users.

By using a central server to maintain the warning message counts and to receive the warning messages themselves, the network traffic generated by the computer security system is minimised, as users need only send a warning message direct to the server, which can then broadcast warnings about suspect data as appropriate to all the users.

In another embodiment, the warning messages generated by a user computer are broadcast to every other user computer, and each user computer is further arranged to host its own message counting system and network security system operable in accordance with any of the above. Such an approach represents a "peer-to-peer" system, and provides advantages that it is not dependent upon a central server for its operation, thereby presenting a more robust distributed system. Such a peer-to-peer system has a potential disadvantage, however, in that depending on the exact implementation it may be that the network traffic required to broadcast the warning messages from each user to every other user is unacceptably high.

To at least partially overcome this problem, in another embodiment there is provided an inter-group communications system operable to allow the communication of warning messages relating to suspect data identified as a possible security threat from the first group of user computers to one or more other groups of other user computers. By splitting the user computers intro groups, the number of warning messages which are required to be transmit is substantially reduced, thereby conserving network signalling bandwidth.

Preferably, the inter sub-set warning messages are transmitted by the inter-sub-set communications system if the number of warning messages communicated by the user computers in the sub-set concerning a particular piece or set of data exceeds at least one threshold value. Preferably the threshold value or values is/are the same as those at which the network security system takes action.

In further embodiments, the message counting system is further arranged to store one or more weighting coefficients relating to one or more particular user computers, and to increment the count maintained for a particular piece or set of suspect data by an amount based upon the weighting coefficient when a warning is received from the one or more particular user computers relating to the particular piece or set of suspect data From a second aspect, the disclosed embodiment(s) also provide a computer readable storage medium storing one or more computer programs which when run on a computer cause the computer to operate in the manner of the computer security system as described above. Such a computer security system may provide all the additional features and advantages mentioned previously.

BRIEF DESCRIPTION OF THE DRAWINGS

An overview of the operation of the disclosed embodiments, together with a description of a number of embodiments thereof, presented by way of example only, will now be made with reference to the accompanying drawings, wherein like reference numerals refer to like parts, and wherein:—

OVERVIEW OF THE OPERATION OF THE INVENTION

Figure 1:
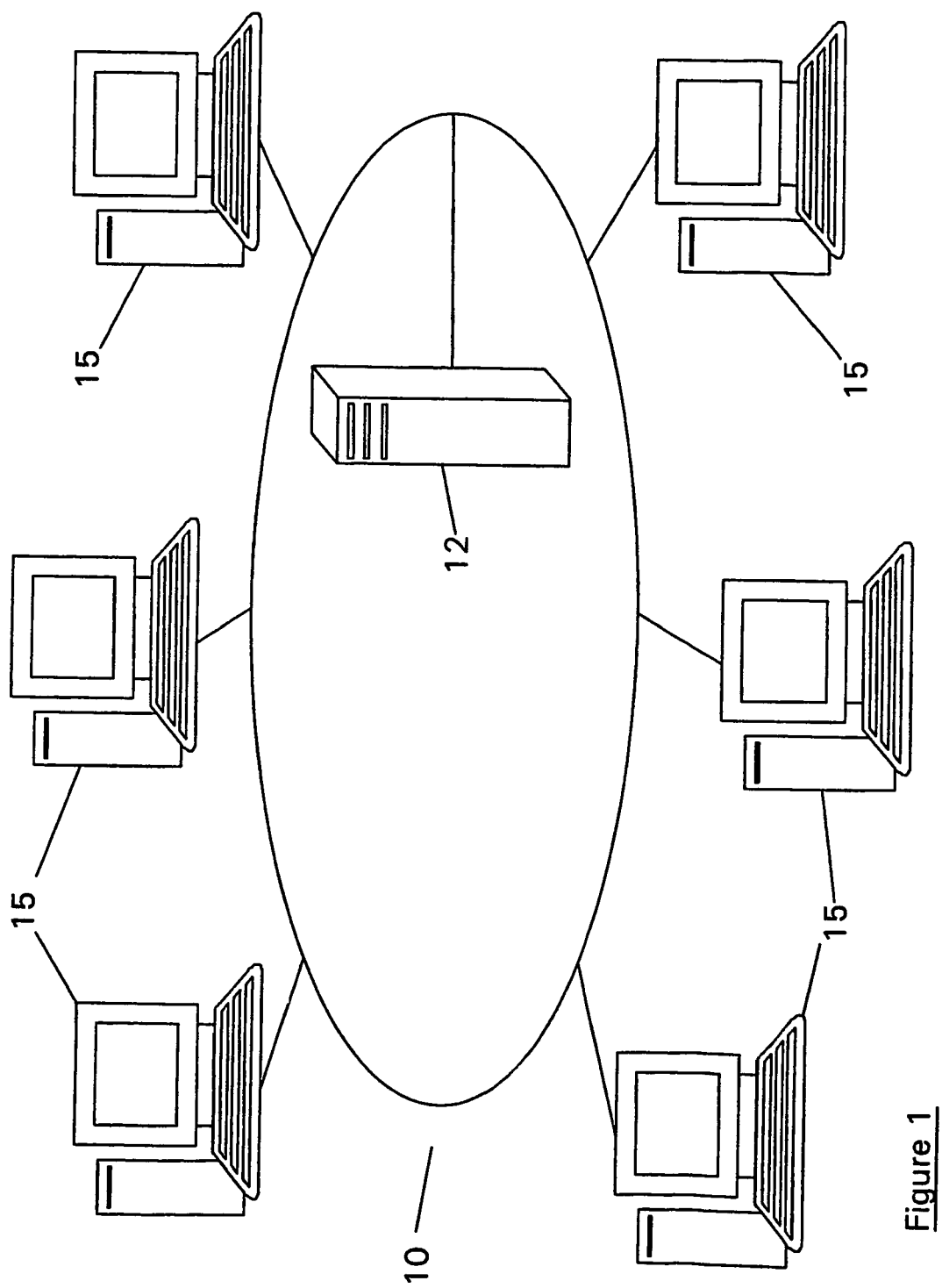
FIG. 1 illustrates a typical network environment in which the computer security system of the disclosed embodiment(s) are intended to operate.

The disclosure recognises and makes use of the fact that a computer system is already inhabited by a number of intelligent agents—the users themselves. In order to summarise the operation of the invention consider an attack by an e-mail "worm" (a type of computer virus such as the "Melissa" virus which was encountered in 2001). A worm is sent to an employee of a given organisation. With some probability the employee opens the e-mail attachment and unwittingly unleashes the worm that causes some damage to the individuals machine and propagates itself to a number of other machines through use of the individuals e-mail system and address book. In each of these cases there is some probability that the user will open the attachment and further propagate the virus. Thus, the statistics are in the worm's favour—not everyone will open the attachment but it only takes a small fraction to do so for the worm to propagate throughout an organisation's computer system. However, for every user who opens the attachment there are likely to be many more who correctly recognise the e-mail as a potential threat and discard it. Vital information is thus gained in this process—an intelligent agent has successfully detected an intrusion—and it is this information that the disclosed embodiments exploits to their full effect. Doing so opens up the potential for the statistics to be turned against the worm and in favour of the protection system.

Within the embodiments the user informs the system of the recognition by forwarding the mail or passing the mail or other program to an anti-virus program that is running on that machine, which then passes it to the server (or in an alternative embodiment direct to the user's peers). The signature of the worm is then quickly ascertained and a count kept of the number of warnings received from users about the worm. Once the count reaches a certain threshold the signature of the worm is distributed to all the other individual machines, who then use the signature to filter any received data or mail. As an alternative the server itself could simply filter out all e-mails with such a signature. In either case the technique of allowing users (or user machines provided with appropriate software agents) to detect and provide warning of the worm aligns well with the trends in the industry towards peer to peer systems where the vast untapped resources at the edges of the network are beginning to be used to greatly enhance storage and computational power for example. One or more embodiments are therefore essentially a peer to peer security system that may tap the vast unused resource of the user's knowledge and experience, or the user computer's processing power.

DESCRIPTION OF THE EMBODIMENTS

Two specific embodiments of the invention will now be described in detail, followed by description of various alterations that may be made to each to provide additional embodiments. Both main embodiments implement a computer security system for use in a network environment. A typical network environment in which one or both embodiments may be used is depicted in FIG. 1.

FIG. 1 illustrates a typical local area network (LAN) configuration. Here, a plurality of user computers 15 are connected to a network 10 which is under the control of a network server 12. The network 10 provides typical network functionality, such as the ability to allow users 15 to communicate with each other and with the server over the network. The network 10 may be any particular network technology, may be wired or wireless, and may be scaled to any network size or architecture known in the art. Therefore, whilst the disclosed embodiments are particularly useful for use within individual organisations provided with a LAN, they may also be used on a wider scale in a metropolitan area network (MAN) or a wide area network (WAN). Within the embodiments, each of the user computers 15, the network itself 10, and the server 12 are provided with appropriate equipment and software to permit the usual network communication functions as are known in the art.

Although the above makes reference to the user computers 15 being part of the same network, it should be noted that it is not essential that each user-computer be located in the same actual network (although this may be preferable). This is because the ability for any particular user computer to be able to send messages either to its peers or to a server is sufficient, and hence all that is required is some message transport mechanism between such parties. Such a message transport mechanism may be a single network to which all the user computers and servers (where required) are connected, or may be a sequence of interconnected networks such as the Internet, with different user-computers actually being part of different networks.

Having described the context in which the disclosed embodiments are intended to operate, a first, preferred, embodiment which represents a preferred mode will now be described with reference to FIGS. 2 to 6.

The first embodiment provides a computer security system wherein identification of suspect data is performed by the users or suitable software agents installed and running on the user's computers at the user's computers themselves, and upon identification of a suspect piece or set of data a warning message is transmitted from the user's computer to the network server 12. At the server the number of warning messages received about a particular piece or set of data is counted, and once the count passes a first warning threshold, a warning message is broadcast to all users, the message containing a signature of the suspect data, such that an anti-virus program located at each user's computer can filter incoming data for the suspect data. If further warnings are received from users by the server, and the count of warning messages exceeds a second threshold, then the server broadcasts a second message to all of the users on the network instructing the anti-virus programs located at each user computer to block the suspect data to prevent any onward transmission or infection.

Figure 2:
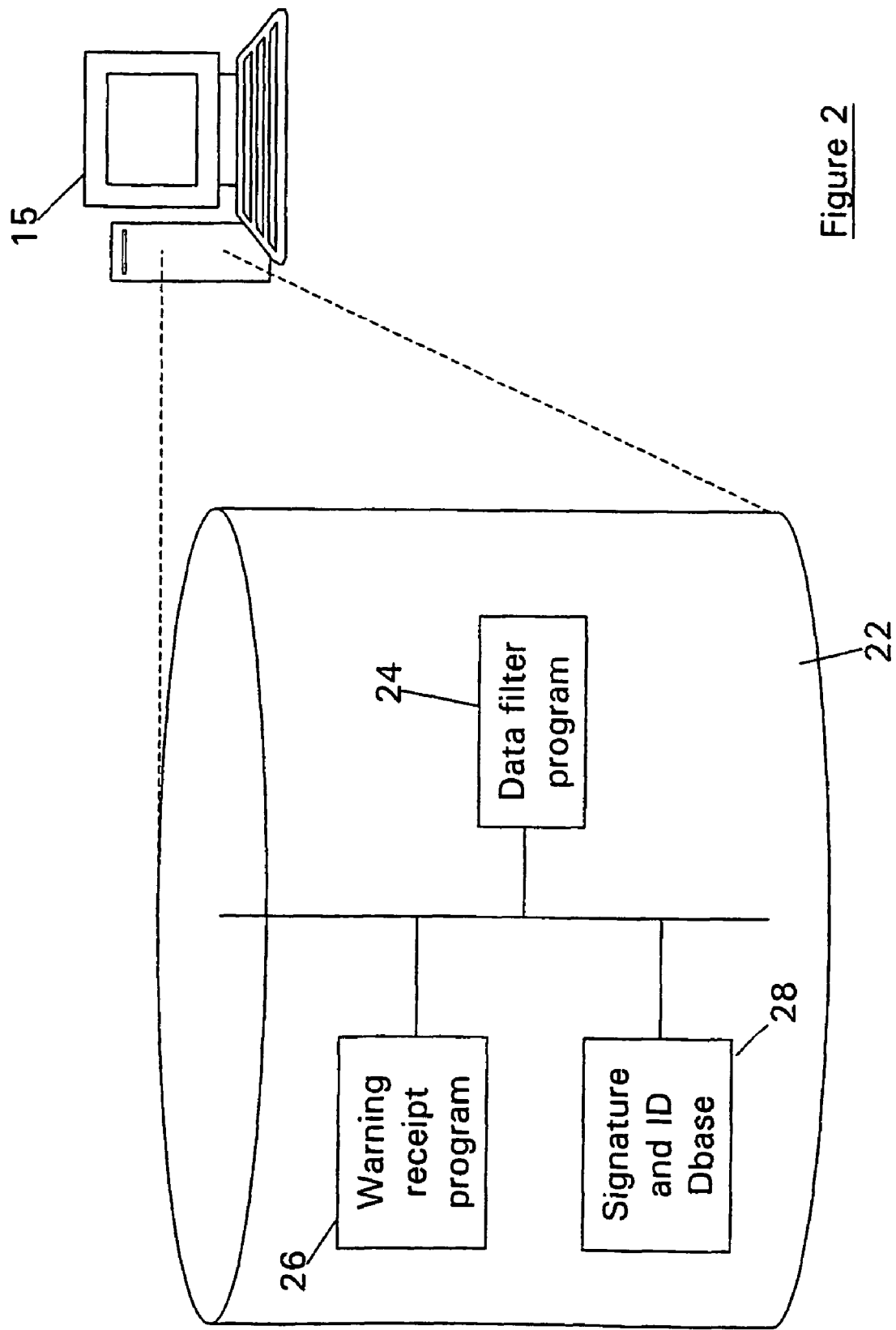
FIG. 2 illustrates a computer storage medium located within each users computer, and depicts the programs and data stored thereon in a first embodiment.

Given the above overview, within the first embodiment each user computer 15 contains a computer readable storage medium 22, as shown in FIG. 2. The computer readable storage medium will typically be a magnetic hard drive, or may equally be a DVD RAM, DVD-RW, DVD+RW, solid state memory, optical disc, magneto optical disc, or the like. The computer readable storage medium 22 at each user computer 15 is arranged to store a data filter program 24, and a warning receipt program 26. In addition, storage space is also provided for suspect data signatures and ID's, stored in the form of a data base 28.

Figure 3:
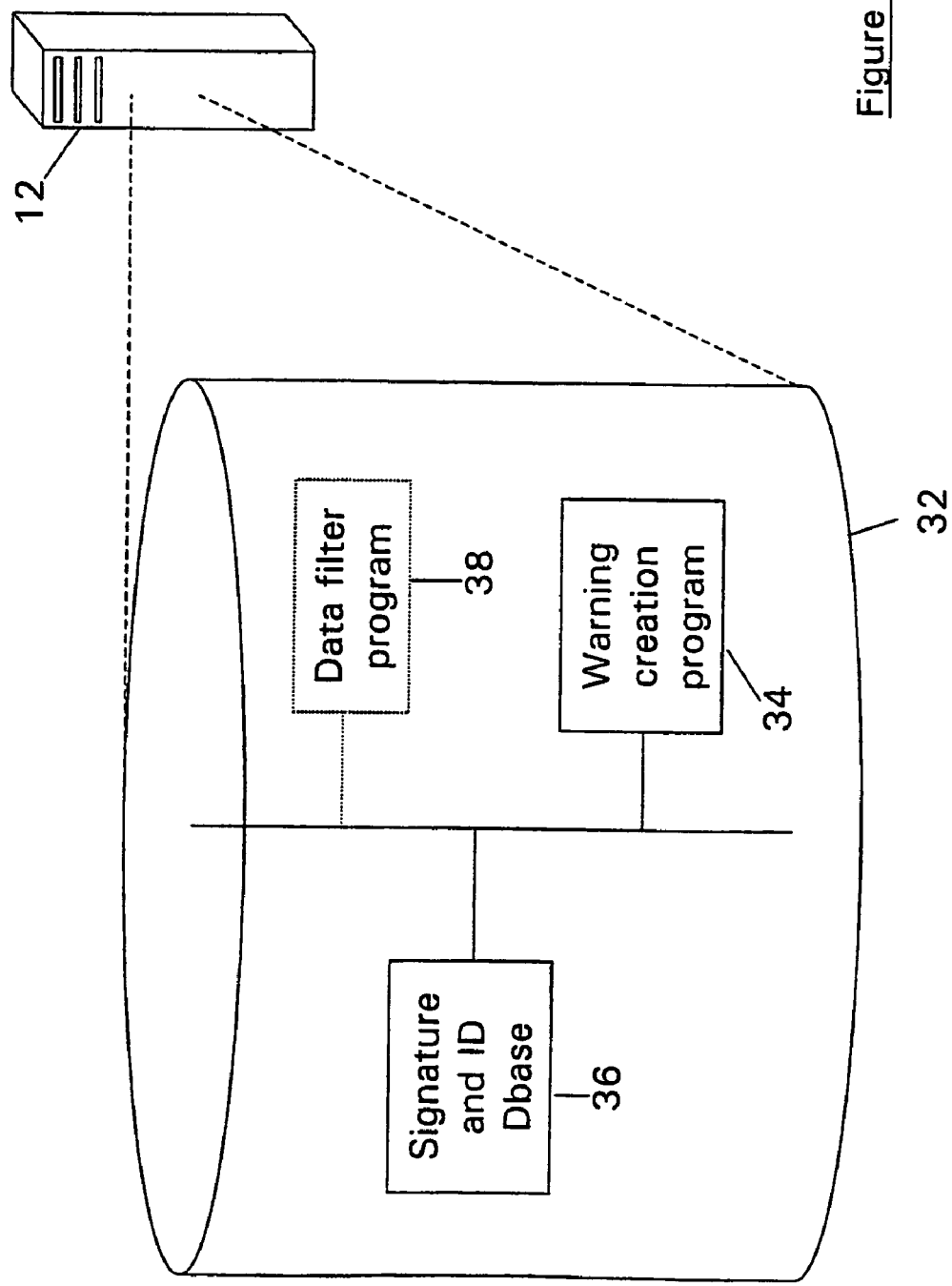
FIG. 3 depicts a computer storage medium located at a server used within the first embodiment, and further depicts the programs and data stored thereon.

As illustrated in FIG. 3, the server 12 within the first embodiment also contains a computer readable storage medium 32 which will typically be a magnetic hard disc, but may also be any of the storage devices mentioned previously in respect of the or each user computer 15. Within the first embodiment the computer readable storage medium 32 stores a warning creation program 34, and a suspect data signature and ID database 36. Optionally, the computer readable storage medium 32 may also store a data filter program 38, to provide an alternative method of operation as will be described later.

Figure 4:
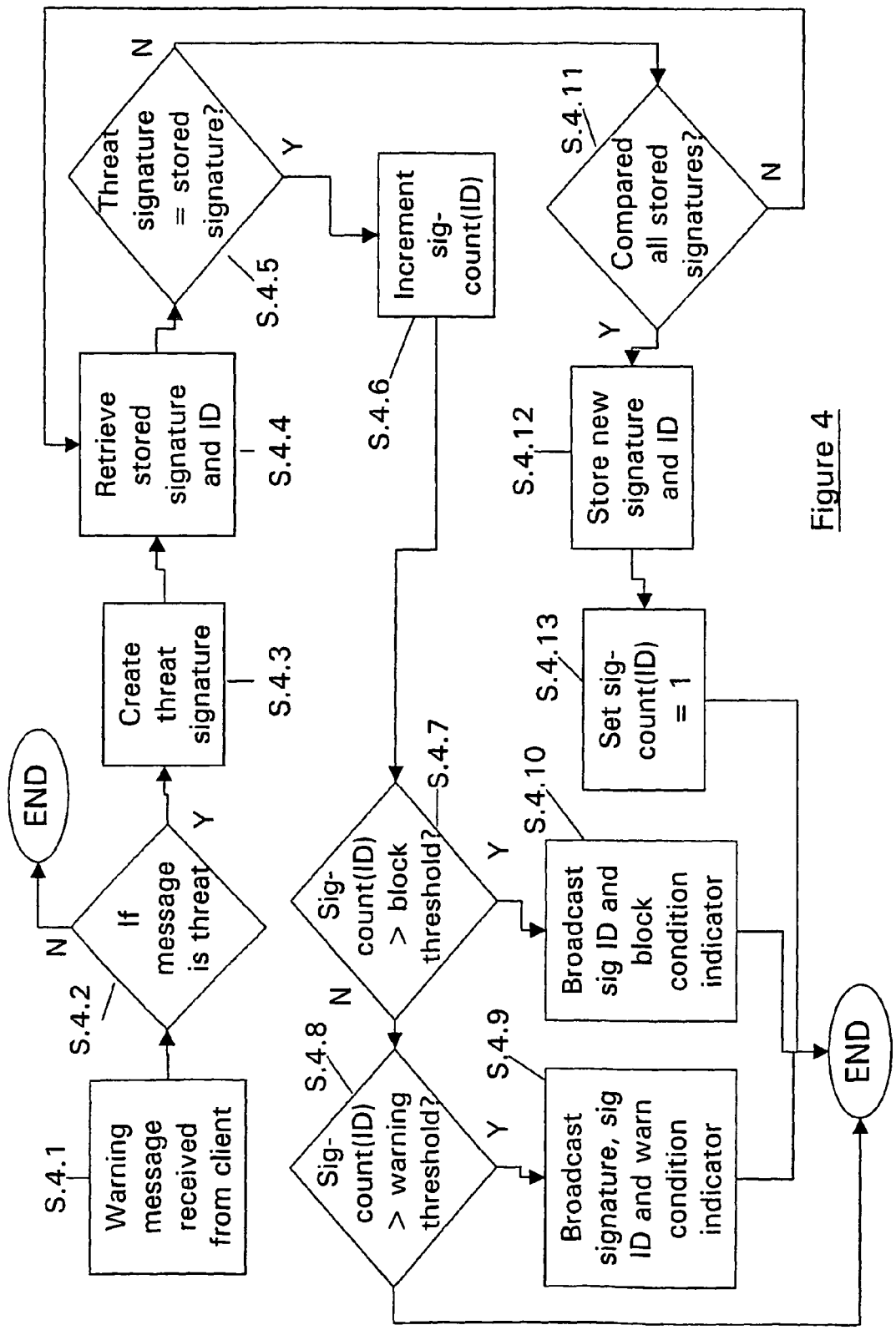
FIG. 4 is a flow diagram showing the operation steps performed by the warning creation program stored at the server in the first embodiment.

Having described the main system hardware elements required by the first embodiment, the operation thereof will now be discussed with reference to the flow diagrams of FIGS. 4, 5, and 6.

Assume that a user computer 15 connected to the network 10 receives a message over the network which contains a computer virus or the like (referred to hereafter as suspect data). Within the first embodiment of the invention a user of the user computer 15 upon reading the message recognises that the message contains such suspect data, and hence within the first embodiment then forwards the suspect data as the payload in a warning message of predetermined format to the server 12. By forwarding the data as the payload encapsulated in a warning message of known format, the server knows that the payload is potentially suspect data, and hence will not become victim to the computer virus itself. At the server, upon receipt of such a warning message from one of the user computers 15, the warning creation program 34 is run, and the steps performed by this program are shown in FIG. 4.

Firstly, at step 4.1 the server receives a warning message from one of its clients, being one of the user computers 15 (as described above). Then, at step 4.2 the server parses the warning message to retrieve the suspect data, and checks the message to see if it could be a computer virus. Such checking preferably takes the form of determining the data type to see if it could feasibly be a virus. Viruses are frequently executable files, such as .exe or .bat on a PC, or macros such as are found in Microsoft® Word® or Excel®. Such a check can conveniently be performed by looking at any file extension on the data. If such checking does not indicate that the data could be a virus then processing ends, as it is assumed that the user has simply made a mistake. Instead, if the warning message is in fact a true warning and the suspect data could possibly be a virus, then processing proceeds to step 4.3.

Note here that the checking step of step 4.2 is performed in the preferred embodiment, but in other embodiments may not be performed, and as such is optional. Where step 4.2 is not performed processing proceeds directly from step 4.1 to 4.3.

At step 4.3 the server reads the suspect data from the payload, and creates a "signature" for the suspect data, to permit the particular piece or set of suspect data to be identified in the future. Such a signature may be conveniently created by running the suspect data through a hash function. Hash functions are well known in the art, and commonly provide a 16 or 20 bit output word unique to any particular piece or set of data input thereto. The key feature of hash functions which may be of use is that the same output word is always output from the hash function for the same piece or set of input data. Thus the hash value for a certain piece or set of suspect data will always be the same, no matter where the suspect data has been received from.

It should be noted that other forms of signature creation other than the use of hash functions may also be of use, the only requirement being that an identifiable unique signature is generated for any particular piece or set of suspect data input into the signature creation function at any time.

Following the creation of the data signature, at step 4.4 the signature and ID database 36 is accessed to retrieve the first previously stored signature and accompanying signature ID therefrom. The signature and ID database 36 in the server 12 is used to store the generated signature ID's from pieces of suspect data received in previous warning messages. At step 4.4 the first signature and ID in the data base is retrieved the first time the controlling function for step 4.4 is called, and thereafter at succeeding calls the next signature and ID in the database list are successfully retrieved.

At step 4.5, the threat signature of the received suspect data generated at step 4.3 is compared with the stored signature retrieved from the database at step 4.4. If the threat signature is not the same as the retrieved stored signature then processing proceeds to step 4.11, wherein a check of the signature and ID database 36 is made to see if all stored signatures have been compared with the new signature. If not then processing proceeds to step 4.4, which retrieves the next signature and ID from the database 36 for evaluation at step 4.5 with the generated data signature for the presently received.

If at step 4.11 it is determined that all of the stored signatures have been compared with the newly created threat signature then it must be the case that the warning message received from the user computer at step 4.1 is the first warning message from any of the user computers to bring to the server's attention the particular piece or set of suspect data contained in the warning message payload. In this case it is necessary for the server to store information on the suspect data, and this is achieved by storing the suspect data signature created at step 4.3 together with a new unique signature ID within the signature and ID database 76. This storing function is accomplished at step 4.12, and thereafter processing proceeds to step 4.13, wherein a count of warning messages received for the particular piece of suspect data is established, and initiated to a value of one. It will be appreciated that a separate count is maintained for every different piece or set of suspect data received in a warning message, and hence at any one time the server will be maintained in several different counts. Therefore, conveniently the various counts may be maintained in a one dimensional array structure, indexed by the particular suspect data's signature ID. Such storage of the count is shown in step 4.13.

Following the storage of the data signature, signature ID, and establishment of the message count for the suspect data, then in the case that the suspect data had never been received before processing then ends.

Returning to a consideration of step 4.5, if it turns out that the particular piece or set of suspect data included in the warning message has been received before in a previous warning message then at some point in the loop formed by steps 4.4, 4.5, and 4.11, the evaluation performed at step 4.5 will return a positive value, in that the threat signature generated at step 4.3 will match a previously stored signature. In this case processing then proceeds to step 4.6, wherein the ID of the stored signature is used at an index into the signature count array, and the particular count for the stored signature is incremented by one to reflect the receipt of an additional warning message relating to the particular piece or set of suspect data to which the signature relates. Following the incrementing of the signature count, processing proceeds to step 4.7.

Step 4.7 represents the first thresholding evaluation performed to determine whether or not a sufficient number of warnings have been received from the user computers concerning a particular piece or set of data such that action should then be taken against that data. Therefore, at step 4.7 an evaluation is performed to determine whether the signature count for the particular piece or set of suspect data is greater than a "block" threshold value. If so processing proceeds to step 4.10, wherein the server then broadcasts a message to all of the user computers 15 on the network, the message containing the particular data signature ID, and a message condition indicator field which in this case contains data instructing the user computers to block the suspect data if it is received thereat. Blocking of the suspect data is performed by the data filter program 24 provided at each user computer 15, the operation of which is described later.

It should be noted that at step 4.10 the message from the server to the clients can contain only the signature ID and the condition indicator and does not necessarily contain the actual signature itself. The reason for this is that prior to any particular piece or set of suspect data becoming blocked a warning message may have been transmitted from the server to the user computers containing the suspect data signature, and hence there is no need to retransmit the signature at step 4.10.

If the evaluation at step 4.7 returns a negative, processing proceeds to the evaluation at step 4.8 wherein the signature count for the particular piece or set of suspect data is compared against a warning threshold level. It should be noted here that the warning threshold level is set less than the block threshold level such that the evaluation of step 4.8 is always found positive before the evaluation of step 4.7. If the evaluation of step 4.8 returns a negative such that the count is less than the warning threshold then this means that not enough warning messages have been received from user computers concerning the particular piece or set of suspect data such that no action should be taken as yet. In this case processing of the warning creation program 34 then ends.

In contrast, if the evaluation at step 4.8 is positive, the processing proceeds to step 4.9 wherein the server broadcasts a message over the network to all the user computers 15, the message can include the suspect data's signature as generated at step 4.3, a new data signature ID, being simply an identifier of the signature which can be used as a short hand means of identifying the particular piece or set of suspect data, as well as a "warn" flag in a data condition field of the message. The presence of the warn flag in the data condition field of the message causes the data filter program 24 at the user computer to warn the user whenever the suspect piece of data is received, as will be described later. Following the broadcast of the warning message at step 4.9, processing by the warning creation program 34 ends.

The output of the warning creation program 34 is therefore a warning message broadcast to all the user computers 15 instructing the user computers to upgrade their threat levels for a particular piece or set of suspect data provided that enough warning messages have been received at the server concerning the particular suspect data. At each user computer upon receipt of a warning message from the server the warning receipt program 26 is run, and the steps performed thereby are shown in FIG. 5.

Figure 5:
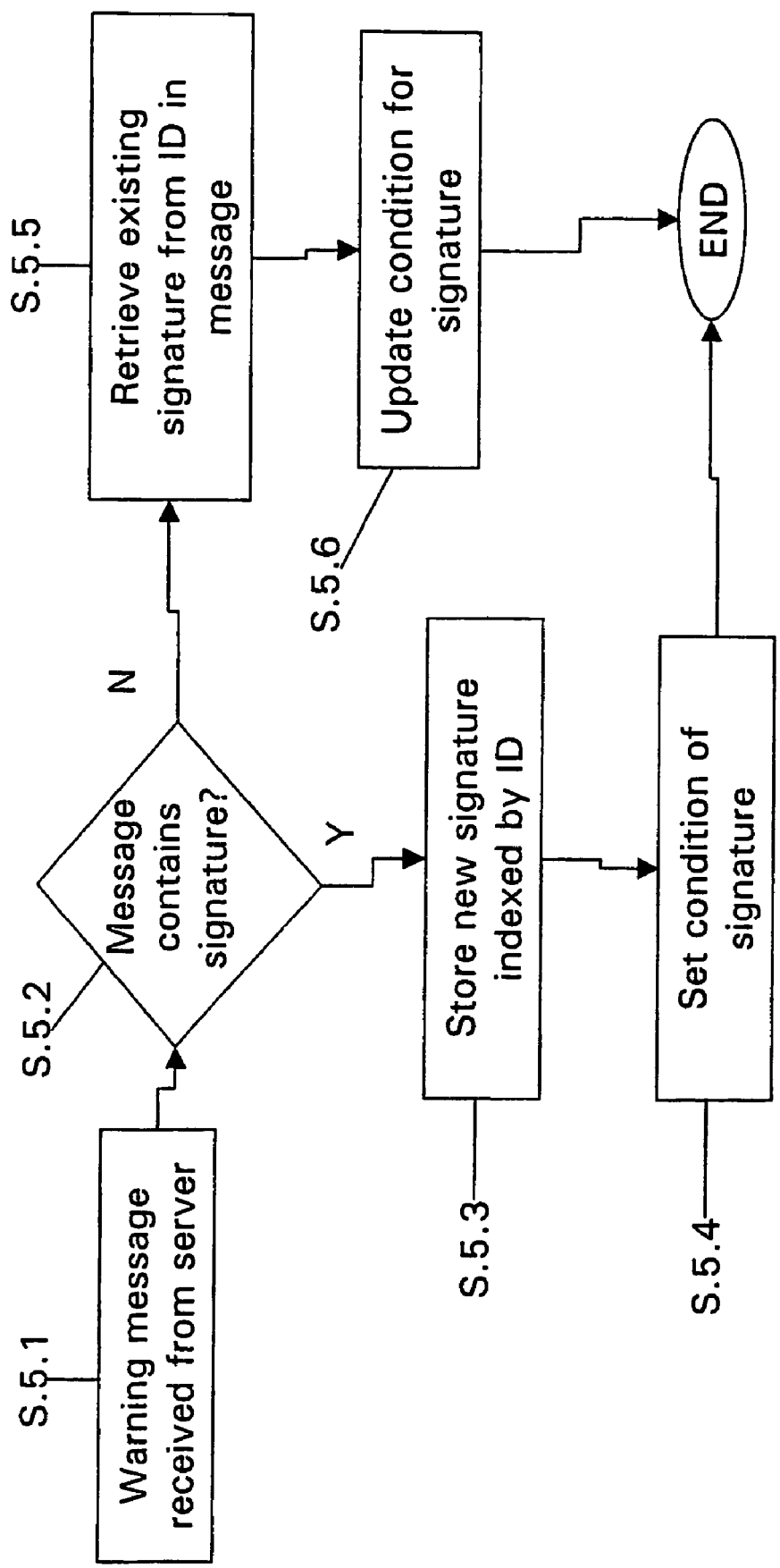
FIG. 5 is a flow diagram showing the method steps performed by the warning receipt program stored at a users computer in the first embodiment.
Figure 6:
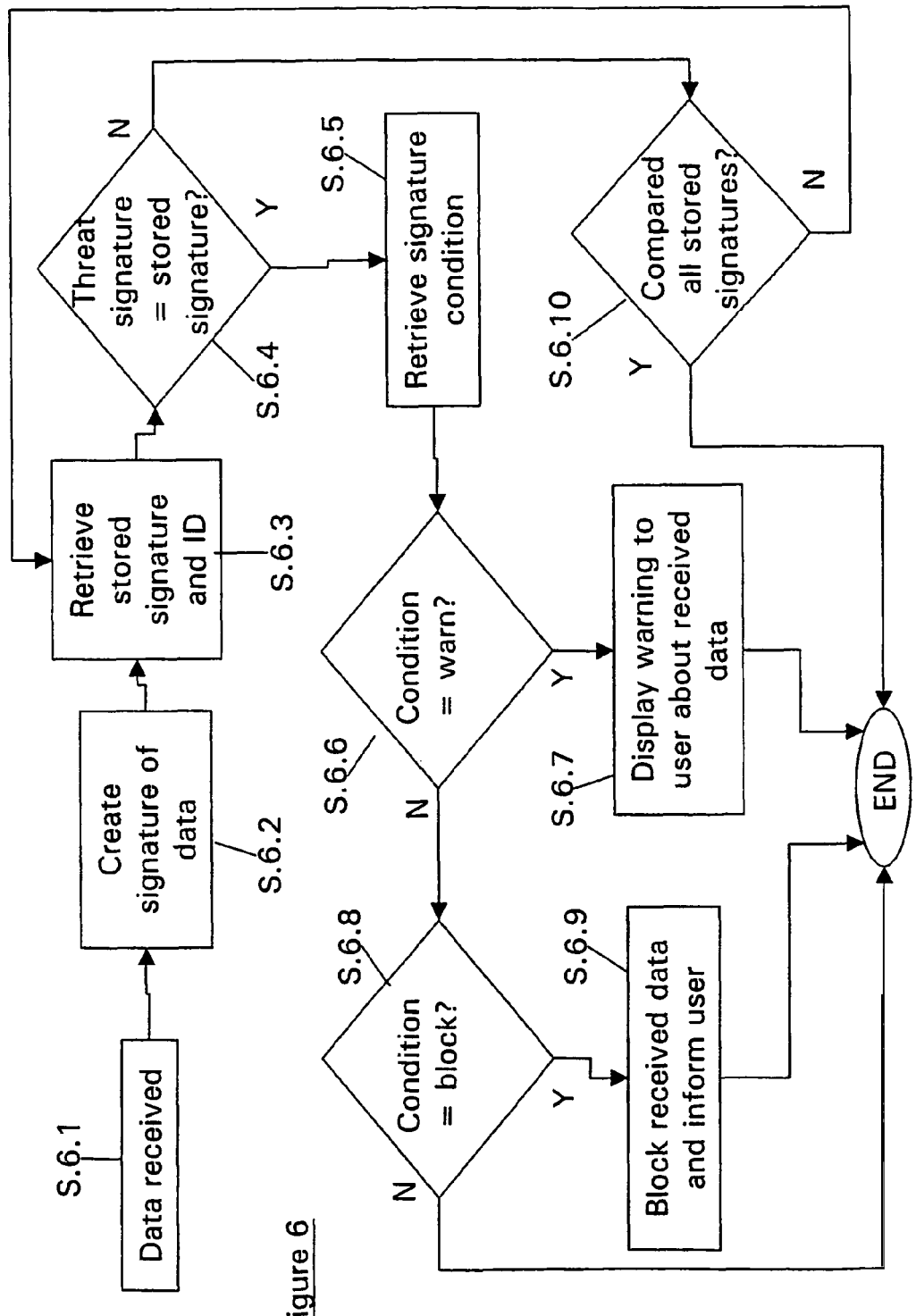
FIG. 6 is a flow diagram showing the steps performed by a filter program in either of the embodiments.

With reference to FIG. 5, at step 5.1 a warning message containing the information described earlier is received from the server. Following this, at step 5.2 the user computer 15 passes the warning message to determine whether or not the message contains a data signature.

If the message does not contain a data signature, then this means that a warning message must have been received at some point in the past from the server containing the data signature, and therefore the data signature will be already stored in the ID database 28 at the user computer 15. In this case processing proceeds to step 5.5, wherein the signature ID contained within the received warning message is used to index and retrieve the appropriate signature from the database 28, whereupon processing then proceeds to step 5.6.

At step 5.6 the data condition indicator which is contained in the warning message received from the receiver is read, and a condition field in the database 28 related to the particular suspect data signature is updated to match the condition indicated in the warning message from the server. In this case, as a warning message will have already been received concerning the particular suspect data and hence a "warn" condition already set, it is likely that the condition is being updated to a "block" condition. Following step 5.6 the processing by the warning receipt program ends.

If at step 5.2 it is determined that the warning message from the server does contain a data signature, then this will be the first warning message received from the server concerning the particular suspect data. In this case, processing proceeds to step 5.3 wherein the received signature is stored in the database 28 indexed by the ID which is also contained in the received message. Furthermore, a condition field in the database related to the signature is also set, at step 5.4. In this case, as this will be the first warning message received from the server about the particular suspect data the condition will be set to a "warn" condition. Following step 5.4 the processing by the warning receipt program 26 ends.

It has thus been described how users can generate warnings about suspect data which are then transmitted to the server, which then broadcasts warnings to all users if enough user's specific warnings have been received. Users can then record the particular security advice broadcast from the server concerning a piece or set of suspect data, and we now describe how user computers 15 may use the broadcast warnings within the data filter program 24.

More particular, as mentioned previously each user computer 15 is provided with a data filter program 24 which is arranged to run in the background of the computer all the time the computer is operating in a similar manner to anti-virus and other security programs of the prior art. The data filter program 24 acts to monitor all data received at the user computer 15 upon which it is stored to determine if any of the received data matches the signatures of any suspect data stored in the signature and ID database 28. The steps performed by the data filter program 24 in performing this function are shown in FIG. 6.

At step 6.1 assume that the user computer 15 has received some data in the form of an email message or the like over the network 10. At step 6.2 the data filter program 24 acts to create a signature of the received data using the same signature generation function as is used in the server 12. That is, the signature of the received data may be created using a hash function or indeed any other signature generating function which provides a repeatably generatable unique signature for a given set of input data.

Following the creation of the data signature, at step 6.3 the signature and ID database 28 at the user computer 15 is accessed and the first signature and signature ID within the database is retrieved therefrom. Upon subsequent calls to the controlling function of step 6.3 the next signature and signature ID in the database list is retrieved successively.

Following step 6.3 processing proceeds to the evaluation of step 6.4, wherein the data signature created at step 6.2 is compared with the retrieved signature from the database 28. If these signatures do not match then processing proceeds to the evaluation of step 6.10, wherein the database is again accessed to see if all signatures have been accessed and compared. If at step 6.10 it turns out that all of the signatures stored in the database have been compared against the signature of the received data and no match has been found, then it can be concluded that the received data is not suspect data, and hence the data filter program ends. In such a case the user is then free to use the received data in whatever manner she chooses.

In contrast, if at step 6.10 it is determined that not all of the stored signatures have been compared against the received data signature, processing returns to step 6.3 wherein the next stored signature and ID in the database are retrieved, and the evaluation of 6.4 is performed once again.

If at step 6.4 it is determined that the received data signature is the equivalent of a previously stored signature then processing proceeds to step 6.5. Here, the database is again accessed to retrieve the signature condition associated with the stored signature to determine what security condition was attached to the signature by the server in the last warning message received from the server concerning the particular signature. Following step 6.5 the retrieved condition is checked at step 6.6 to see if it is a "warn" condition, and if so processing proceeds to step 6.7, wherein a warning is displayed on the user computer's screen to warn the user about the received data. Following the display of the warning the particular process performed by the data filter program 24 ends, although it should be noted that the data filter program will continue to run continuously in the background to check whenever data is received.

If the retrieved signatory condition is not a "warn" condition then processing proceeds to the evaluation of step 6.8 wherein the condition is checked to see if it is a "block" condition. If so then at step 6.9 the data filtering program 24 acts to block the receipt of the suspect data either by preventing the computer from downloading it from the server or from merely deleting it from the user computer's local storage, and again the user is preferably informed of this action. Following this action the processing performed by the data filter program 24 ends, although again the program will continue to run in the background to detect the receipt of new data.

If the evaluation of step 6.8 does not indicate that the retrieved signature is a "block condition", then the data filter program 24 processing ends, and the program returns to running in the background, as described previously.

The first embodiment therefore presents a computer security system whereby computer viruses and the like can be detected by individual users, who transmit warnings to a server which then broadcasts warnings as appropriate to all users if the number of individual warnings received from individual users exceeds certain thresholds. The use of thresholding in the server instills a degree of order, in that it is only once a particular threshold level of warnings have been received that action is taken by the server and user computers against the suspect data. This prevents, for example, inexperienced users who may mistake acceptable data for suspect data from initiating a security alert on the acceptable data which may prevent other users from receiving that data, for example.

Furthermore, the threshold levels for both the "warn" and "block" conditions may of course be set at any level required, and may even be simply one. The assumption is made, however, that in order for the embodiment to operate in a meaningful manner the warn threshold is less than or equal to the block threshold.

Within the preferred embodiment we have described the data filter program 24 as being located at each of the user computers 15 and running thereat. However, in a slight variation of the first embodiment it would of course be possible for the data filter program 24 to also run at the server to screen messages and data routed therethrough. In this case the operation of the data filter program would be exactly the same as previously described with respect to FIG. 6, however it would mean that the user computers 15 would neither need the data filter program 24, the warning receipt program 26, or the signature and ID database 28, as all blocking operations could be performed centrally. However, in the case that it is desirable for users to be warned about data to be received, then it will still be preferable to have the data filter program 24, warning receipt program 26, and signature and ID database 28 at the user computer 15 as described previously in order to allow such warnings.

In another variation of the first embodiment, in another embodiment a step equivalent to step 4.2 can be performed at the user computers before a warning message is generated. Here, after a user has identified a piece of data as suspect and instructed her computer to send a warning message to the server, prior to compiling and sending the message the warning creation program 34 controls the computer to check if the data identified as suspect by the user could possibly be a virus. Such checking is substantially identical to the check performed at step 4.2, i.e. takes the form of determining the data type to see if it could feasibly be a virus. Viruses are frequently executable files, such as .exe or .bat on a PC, or macros such as are found in Microsoft® Word® or Excel®. Such a check can conveniently be performed by looking at any file extension on the data. If such checking does not indicate that the data could be a virus then no warning message is sent, as it is assumed that the user has simply made a mistake. Instead, if the data is of a data type which could be a virus (e.g. an executable or the like) then the warning message is transmitted.

One advantage of the first embodiment which makes use of the server to keep track of the number of warning messages received about a particular piece of suspect data is that the network traffic overhead introduced by the security system is minimised, as users need only send warning messages to the server, which can then broadcast warning condition messages as appropriate.

A second embodiment will now be described with reference to FIGS. 7 to 10.

The second embodiment of the invention presents a pure "peer to peer" system which does without the server 12 of the first embodiment. Instead, within the second embodiment each user computer 15 itself individually keeps count of the number of warning messages received from its peers concerning suspect data, and in turn when a user computer detects suspect data it generates and broadcasts a warning message to all of its peers. This arrangement has the advantage that it is not dependent upon a central server for operation, and is therefore much more robust and immune to the loss of one or more of its elements than the client-server architecture of the first embodiment.

Figure 7:
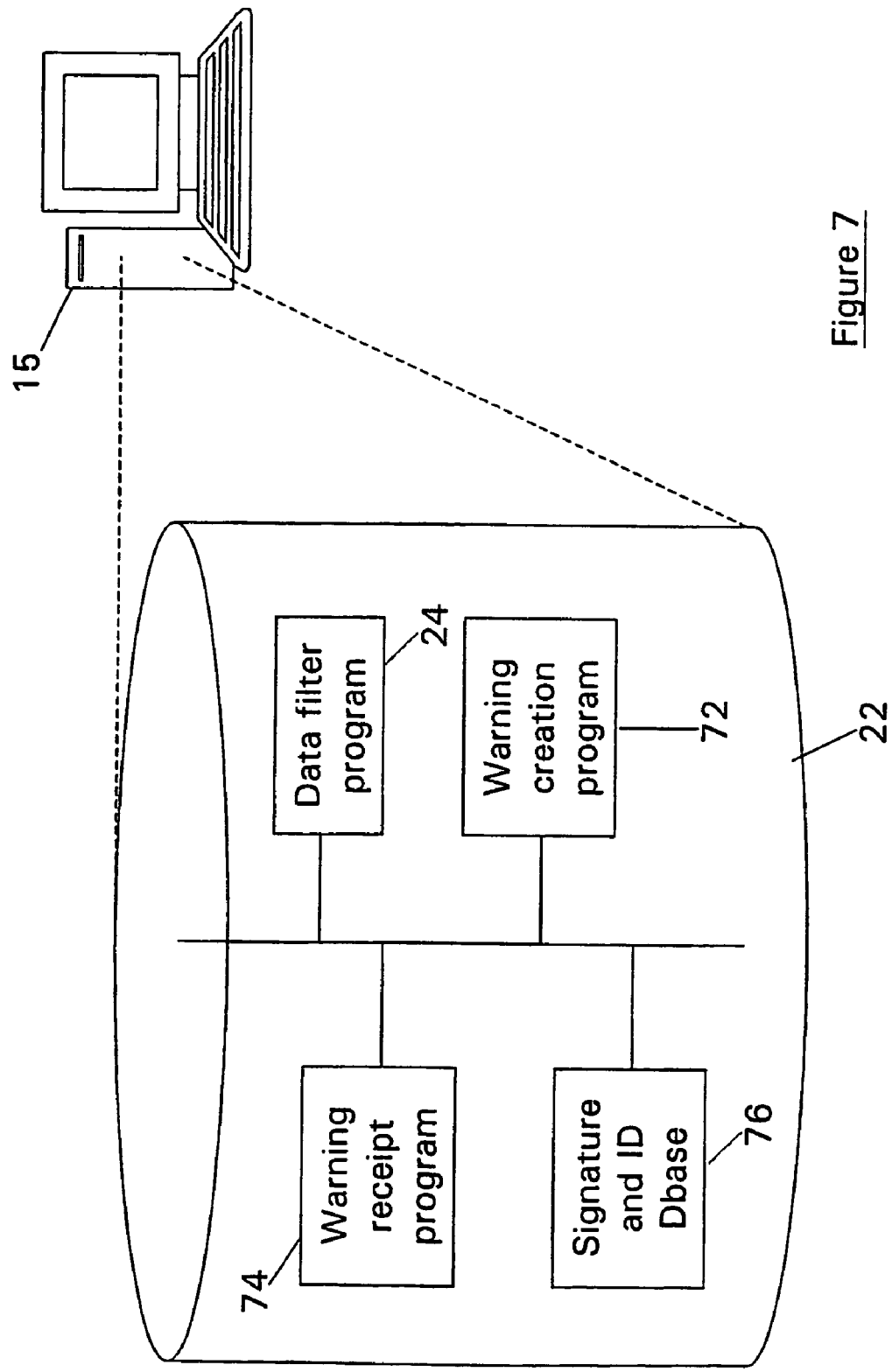
FIG. 7 depicts a computer readable storage medium located at a users computer in a second embodiment, and further depicts the programs and data stored thereon.

FIG. 7 illustrates the software elements present at a user computer 15 in the second embodiment of the invention. More particularly, as in the first embodiment the user computer 15 is provided with a computer readable storage medium 22 on which is stored a data filter program 24, a warning creation program 72, a warning receipt program 74, and a signature and ID database 76.

Within the second embodiment the data filter program 24 and the warning creation program 72 both continuously run in the background on the users computer at all times. The data filter program 24 operates in a similar manner as previously described in the first embodiment with respect to FIG. 6, that is it acts to check the signature of received data against signatures of suspect data stored in the signature database 76, and takes action against any received suspect data as necessary. In this respect, the operation of the second embodiment is like that of the first embodiment. The difference between the second embodiment and the first embodiment lies, however, in the fact that each user computer 15 directly broadcasts warnings to each of its peer computers (i.e. the other user computers 15), and in addition each user computer 15 also keeps its own track of the count of warning messages received against each piece of suspect data. These functions are performed by the warning creation program 72 and the warning receipt program 74, as described next.

Figure 8:
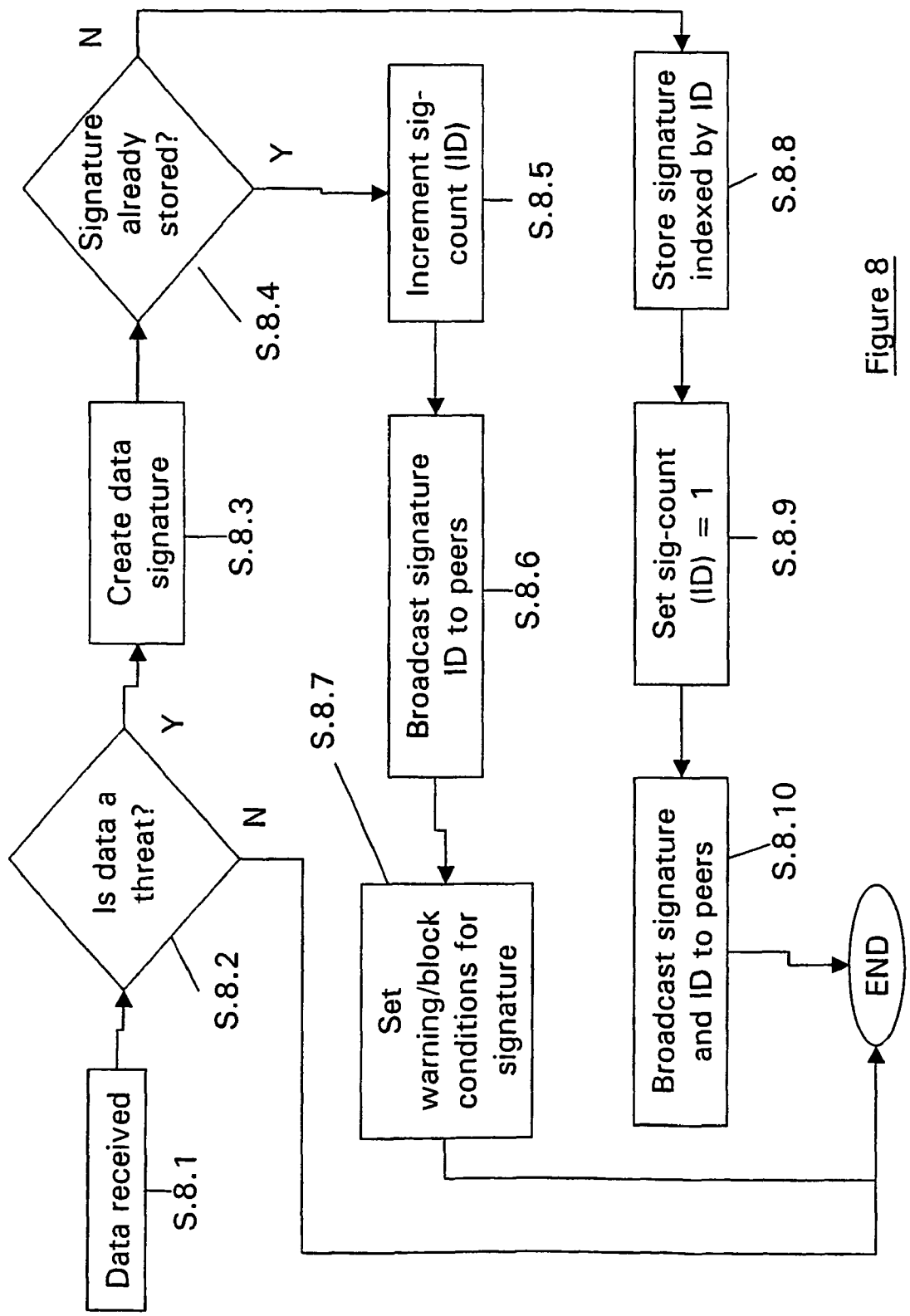
FIG. 8 is a flow diagram of the steps performed by a warning creation program in the second embodiment.

The operation of the warning creation program 72 is shown in FIG. 8. Here, at step 8.1 data is received at the user computer 15 over the network 10. At step 8.2 an evaluation is performed to determine whether the received data is a security threat or not. As with the first embodiment, this evaluation is preferably performed by the actual human user of the computer 15 who employs her expertise to determine whether or not the received data is a computer virus or the like. In alternative embodiments, however, it may be that this evaluation could be performed by a software agent installed on the users computer, the software agent acting to monitor the functions of the computer to determine if it is under attack from a computer virus. Within the first and second embodiments, however, we prefer the use of a human operator to perform the evaluation.

If the evaluation at step 8.2 concludes that the received data is not a threat then the processing performed by the warning creation program on the received data ends and the program returns to running in the background until further data is received in the future.

If it is determined at step 8.2 that the received data is a threat, then at step 8.3 a data signature for the received data is created. As in the first embodiment, the signature generation function may be a hash function or the like or any other suitable signature generation function which is capable of repeatably generating the same signature for a given set of input data. Furthermore, it is preferred that each user computer 15 must use the same signature generation function, but it is only necessary that when the same set or piece of suspect data arrives at any of the user computers, each of them creates the same signature therefor.

At step 8.4 a check is made to see whether the generated data signature has already been stored in the signature and ID database 76, and if not then at step 8.8 the signature is stored in the database, and is allocated a globally unique ID. The ID for the signature is generated by the user computer, preferably from a list of ID's which have been specifically allocated to that user computer for allocation to signatures thereby.

Following step 8.8, at step 8.9 a message count is instantiated for the particular signature generated by the received data, and is set to the value one. As in the first embodiment, the various count values for each piece of suspect data may be stored in a one dimensional array indexed by signature ID.

Following step 8.9 at step 8.10 the warning creation program causes the user computer to broadcast the data signature and the signature ID to all of its peers as a warning message. As in the first embodiment, the warning message preferably takes a known format, with the signature and signature ID as particular fields within the warning message. Following the broadcast of the warning message, at step 8.10 processing of the warning creation program ends, and it returns to run in the background.

Returning to the evaluation at step 8.4, if it is determined that the data signature for the received data has already been stored (i.e. the data has already been identified as suspect by either the present user, or one of the other users who have then broadcast a warning message which has been received at each user computer) then processing proceeds to step 8.5, wherein the message count maintained for the particular signature is incremented to reflect the fact that the data has in fact been identified once again as a threat.

Next, at step 8.6 the signature ID is broadcast to every other user in the system as part of a warning message, and then following that at step 8.7 the appropriate warning or block conditions are set for the signature based on the warning and block threshold values. The specific operations required by step 8.7 are shown in more detail in FIG. 10.

Figure 10:
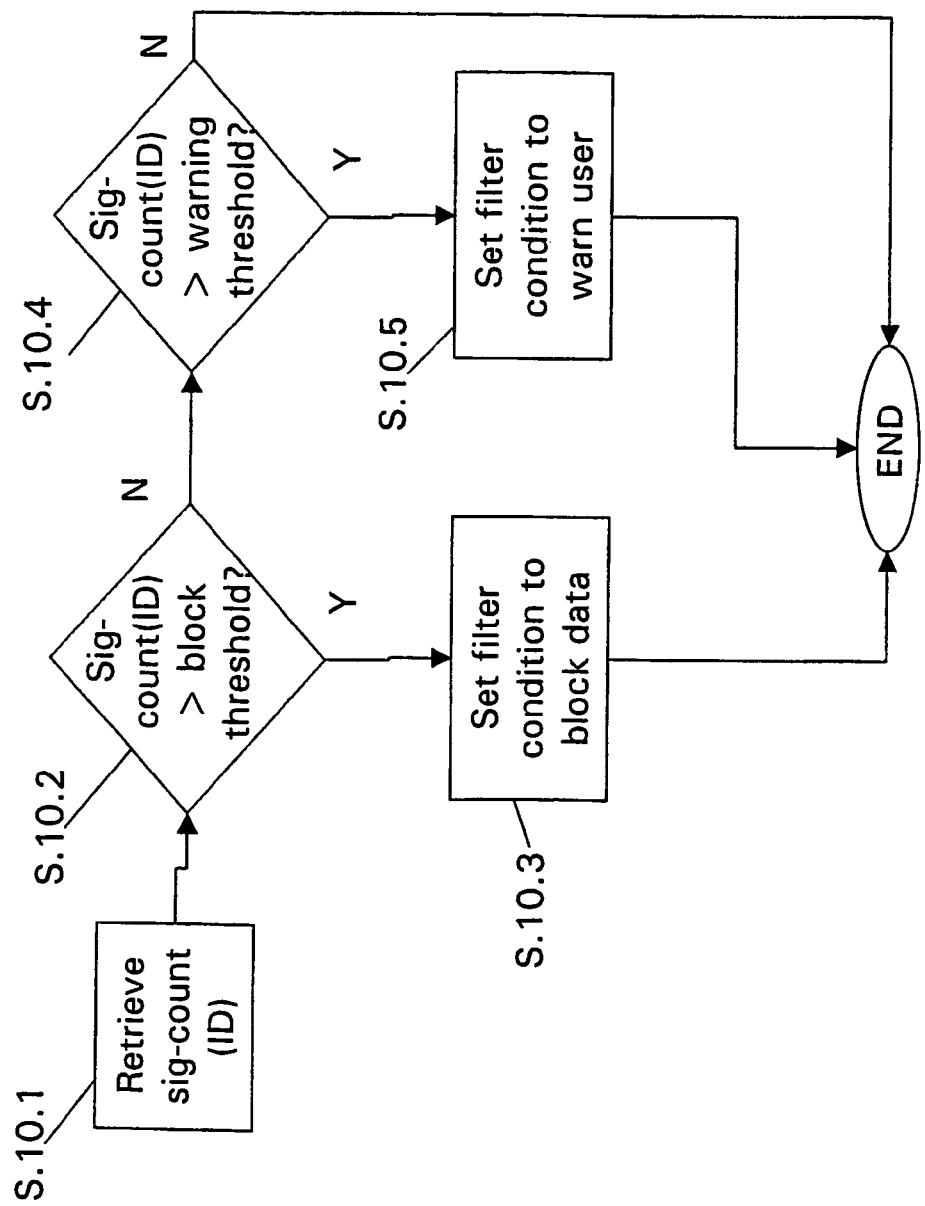
FIG. 10 is a flow diagram illustrating the steps performed by one of the functions in both FIGS. 8 and 9.

With reference to FIG. 10, the steps required for setting the warning or block conditions for a particular data signature are as follows. At step 10.1 the message count for the particular data signature is retrieved, by indexing into the counter array using the signature ID. Then, at step 10.2 the retrieved message count is compared against the block threshold, and if larger than the threshold at step 10.3 the security condition for the data signature is set to "block". As in the first embodiment, this security condition is stored in the signature and ID database 76, and is used by the data filter program 24 to filter received data.

If the warning message count for the particular data signature is not greater than the block threshold then the message count is compared against the warning threshold at step 10.4. If it is not greater than the warning threshold then no warning or block condition is set for the particular data signature. In contrast, if it is greater than the warning threshold then the security condition for the particular data signature is set to "warn" at step 10.5, which is again used by the filter data program 24 as described before in respect of the first embodiment.

Returning to FIG. 8, once the warning or block conditions have been set for the data signature, the specific processing performed by the warning creation program 72 ends, and it returns to running in the background until further data is received.

Figure 9:
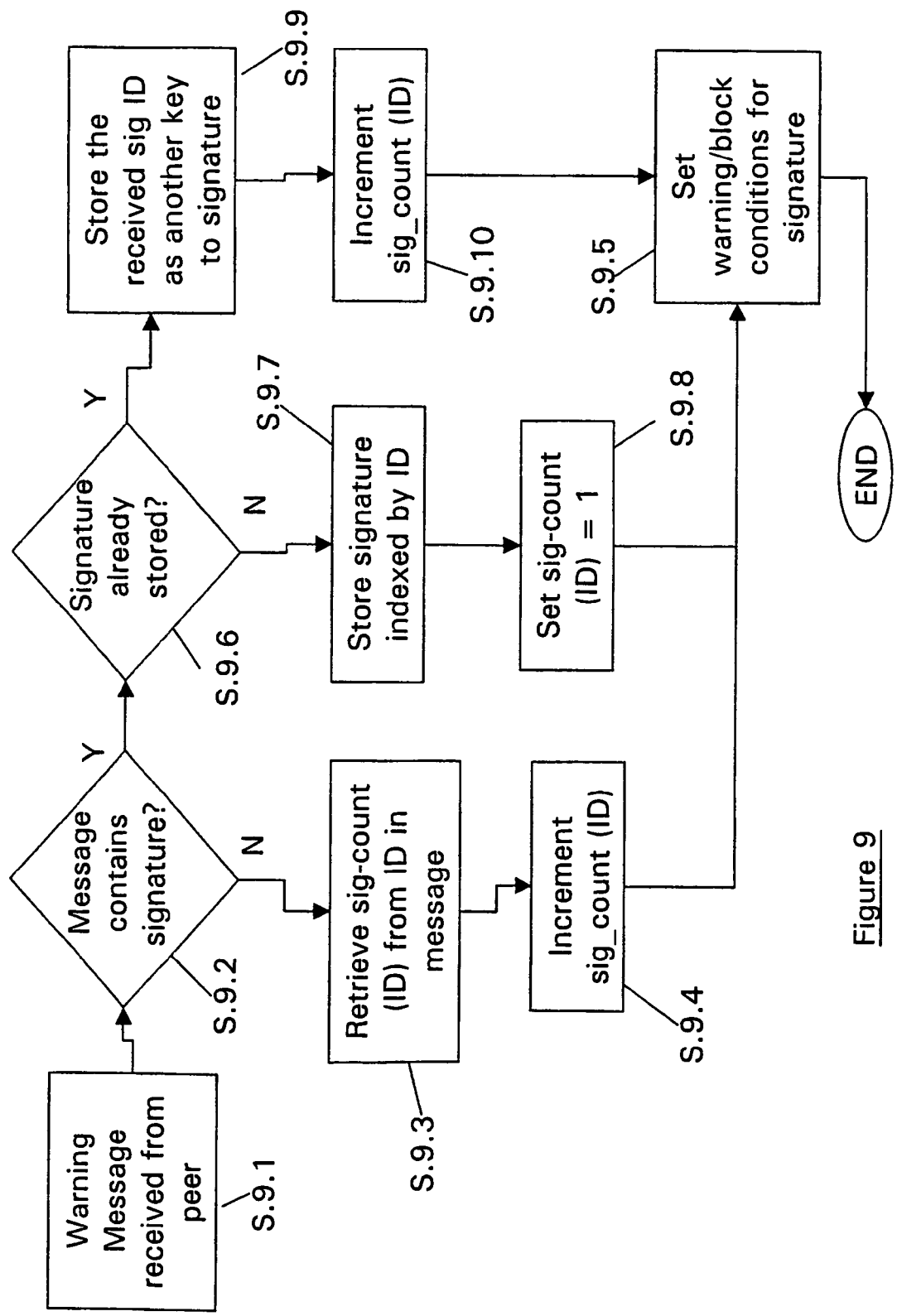
FIG. 9 is a flow diagram of the steps performed by a warning receipt program in the second embodiment.

Turning now to the operation of the warning receipt program 74, this program operates whenever a warning message generated by a warning creation program stored on another user's computer is received. The operation of the warning receipt program 74 is shown in FIG. 9.

At step 9.1, a warning message is received from one of the other user computers. The warning message is of course in a predetermined format which identifies it as such. Then, at step 9.2 the warning receipt program 74 acts to parse the message to see if it contains a data signature relating to suspect data. Recall here that the data will have been determined as suspect by the user of the user computer from which the message was received. If it is determined that the message does not contain a signature, then this means that the data will have already been determined as suspect previously, and hence should already be stored in the user computer's signature and ID database 76. Therefore, at step 9.3 the warning receipt program acts to retrieve the message count for the particular suspect data to which the warning message relates, using the signature ID which will have been included in the warning message (recall here that at step 8.6 in the warning creation program where the suspect data has already been identified as such a warning message is still sent out including the suspect data signature ID). Then, at step 9.4 the retrieved message count for the suspect data is incremented to reflect the additional warning, and at step 9.5 the warning or block conditions for the data signature are also set, following the procedure of FIG. 10, as described previously.

If it is determined at step 9.2 that the message does contain a signature, then processing proceeds to the evaluation of step 9.6 wherein it is determined whether or not the received signature has already been stored. If not processing proceeds to step 9.7 wherein the signature is stored in the signature and ID database 76 indexed by the signature ID included in the received warning message. At step 9.8 a message count is instantiated for the newly stored data signature, and is set to one. As described previously, the count values for each particular signature can be stored in a one dimensional array, indexed by each signature ID.

Following step 9.8 processing proceeds to step 9.5, wherein the warning or block conditions are set for the particular signature, using the procedure of FIG. 10.

Returning to step 9.6, if it is determined that the signature received in the warning message has already been stored then processing proceeds to step 9.9, wherein the received signature ID is stored for use as another key to the signature. In such a case a count value should be instantiated related to the received signature ID, with its value set to the same value as the count indexed by the ID of the already stored signature which matches the received signature. Then, at step 9.10 both of the count values stored for each ID (the received ID, and the ID of the previously stored ID which matches the received signature) are incremented to reflect the receipt of the additional warning. Finally, following the increment of the message counts for the signature the warning and block conditions are set for the signature once more, using the procedure of FIG. 10.

Therefore, as described the second embodiment provides a pure peer to peer system which incorporates the distributed warning capabilities of the security system of the present invention with the ability to threshold the warnings so as to be able to provide a graded reaction locally at each user computer. The provision of such a peer-to-peer operation provides for a more robust system, but as mentioned earlier may increase network overheads due to broadcasting every warning message to every user.

As a modification to the operation of the second embodiment, an additional checking step analogous to step 4.2 of the first embodiment may be performed between steps 8.2 and 8.3 of FIG. 8 depicting the operation of the warning creation program 72. Here, after the human user has identified data as suspect at step 8.2, an additional check is made to see if the data could possibly be a computer virus. Such checking preferably takes the form of determining the data type to see if it could feasibly be a virus. Viruses are frequently executable files, such as .exe or .bat on a PC, or macros such as are found in Microsoft® Word® or Excel®. Such a check can conveniently be performed by looking at any file extension on the data. If such checking does not indicate that the data could be a virus then processing ends, as it is assumed that the user has simply made a mistake. Instead, if the warning message is in fact a true warning and the suspect data could possibly be a virus, then processing proceeds to step 8.3, and onwards as previously described. The operation of the other programs in the second embodiment remains unchanged.

It should be noted here that as the second embodiment does not require a server to act centrally, but rather is a true peer-to-peer system, it is particularly suitable for implementation on networks such as ETHERNET and the like.

Various further modifications may be made to either of the first or second embodiments to produce further embodiments, as described next.

In further embodiments it is possible to add more sophistication to increase the power of the system. For example, users could be given the ability to respond to a warning to inform the server of whether they agree with the assessment or not—this would give the potential of reducing the count number if appropriate. The decision as to whether a particular program was a threat or not would then be a collective decision from the whole community.

Furthermore it is also possible to build in trust models for each user such that some users have greater influence than others. Such trust models could be pre-defined according to the users position within the community/organisation, such that a warning received from a user with a high trust rating increments the signature count for a particular piece or set of suspect data more than another user with a lower trust rating. Each trust model may then also be adaptively varied by judging the accuracy of a prediction that a user has made against a final collective decision, and any further warnings registered by that user could be weighted according to the trust in that users demonstrated decision-making ability.

In other embodiments a community of organisations could be formed that would extend the collaboration beyond the limits of a single organisation through sharing of knowledge. Any discoveries in one organisation could be passed on to all other organisations in the community and vice versa. This would greatly extend the power of the system and in many cases allow rapid response to intrusions experienced in other organisations without any internal hits being experienced to the remaining organisations using the system.

Moreover, in another embodiment the actual number of warnings received concerning a particular piece or set of suspect data could be displayed to the user if the suspect data is received at the user's computer, and the user could then decide what action to take himself. Such a scheme is akin to the "warn" action of the primary embodiments, but provides the user with the additional information of how many other users have determined the data to be threat, thus providing the user with an assessment analogous to a community "confidence-level" in the data, such a level being of greater resolution than the simple "warn" or "block" conditions. Furthermore, such a scheme would not require the system to actually perform automatic blocking of suspect data, as this could be left to the user to do himself. This mode of operation provides the additional potential advantage that a highly skilled or confident user may not wish to act on the community warning if he is sure that it may be wrong, thus increasing the flexibility of the system.

Figure 11:
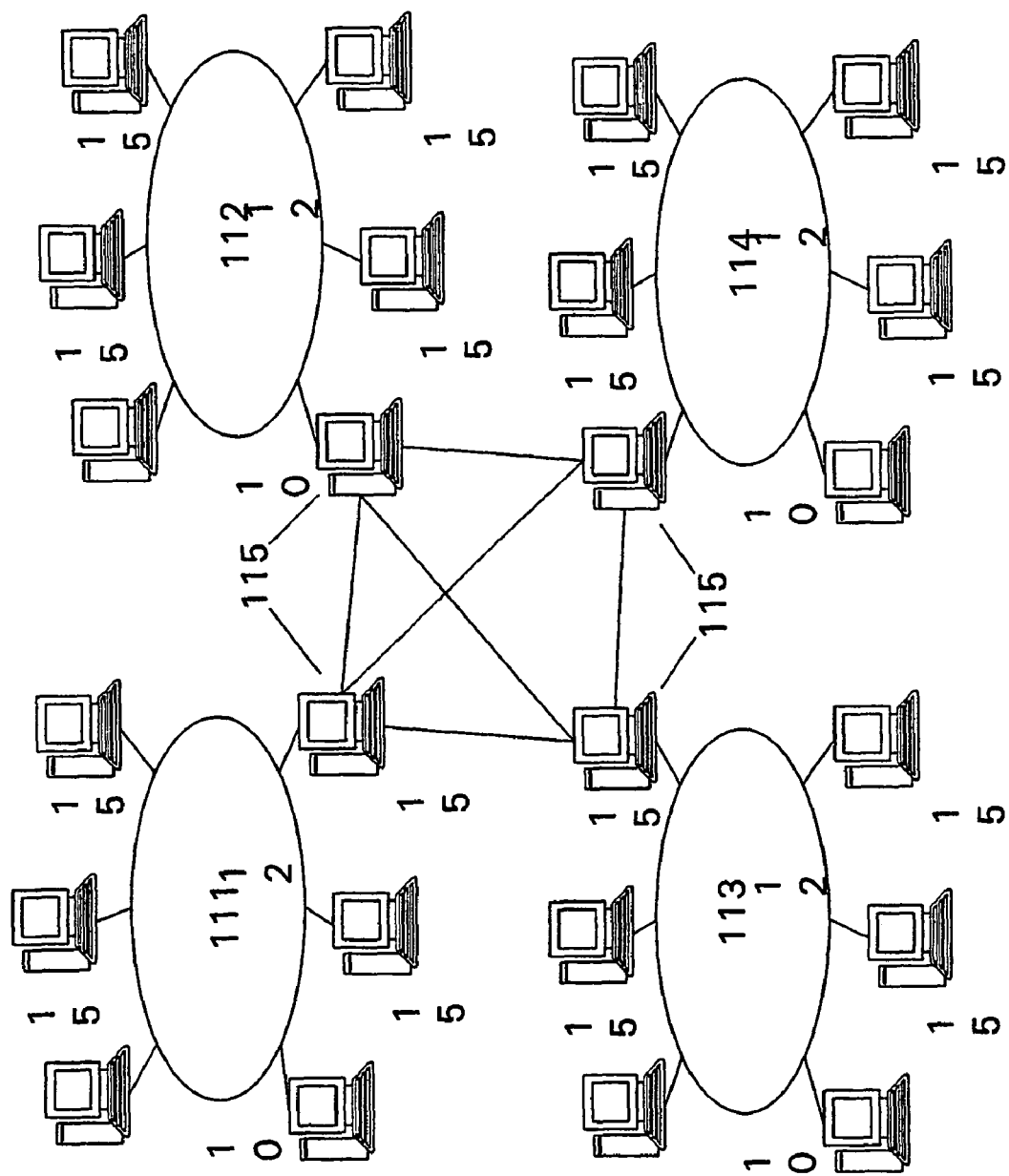
FIG. 11 illustrates an organisational architecture of user computers which may be used in another embodiment.

Furthermore, in another embodiment based on the peer-to-peer architecture of the second embodiment, rather than broadcast to all peers e.g. all users in BT—sub-communities of peers are formed so that the initial broadcasting of warning messages concerning a particular is limited to a smaller number of peers. An example of such an architecture is shown in FIG. 11, whence it will be seen that a plurality of sub-communities 111, 112, 113, and 114 may be provided, each connected to each other. Only when the count passes the warning threshold in one of the sub-communities is the suspect data signature distributed further. This limits the overheads incurred by false positives in that any particular sub-community would need to agree that a particular piece or set of data was a threat before it was broadcast to the wider community. "Crossover points" are provided between the sub-communities so that inter-group (or alternatively "inter-community") warnings may be passed on to other sub-communities by the provision of one of the peers 115 in a particular sub-community acting as the bridge via a communications link to another peer in a neighbouring sub-community, and only communicating with that other peer when the warning (or block) threshold has been passed in its own parent sub-community i.e. the sub-community has decided that the particular piece or set of suspect data really could be a threat.

The processing steps involved in such an embodiment are almost identical to those required in the second embodiment, with the addition that the processing steps depicted in FIG. 10 are altered to include an additional step after step 10.3 or 10.5 wherein once the filter condition has changed (as a consequence of either step 10.3 or 10.5) if the computer is a bridging peer to another sub-community then an inter-group warning message is sent to the connected sub-community informing the other peer that a change in the filter condition has occurred for a particular piece or set of suspect data. Such an inter-group warning message should preferably include at least the data signature, as well as a warning condition indicator to communicate the threat level (e.g. warn or block) decided by the sending sub-community. By sending such a warning message to other sub-communities, the bridging peer is effectively declaring to the other sub-communities to which it is connected that its peers in its own sub-community have found the suspect data identified in the warning message to be a security threat.

Conversely, when an inter-group warning message is received at a bridging peer from another sub-community, the bridging peer should broadcast the inter-group warning message onwards to all its own peers as an intra-group message, to inform them of the threat assessment made by the neighbouring community. Each peer can then store the suspect data signature in its signature and ID database 76, for future reference by the data filter program 24 as needed (and in the same manner as already described in relation to the second embodiment).

Whether or not a user computer in a sub-community uses a forwarded inter-group warning message directly to initiate action (such as "warn" or "block" for the indicated suspect data) is optional, as it could be that it may wish to wait until it's own community has also agreed on action in respect of the same suspect data before actually initiating a "warn" or "block" condition for the data. Conversely, where a particular user-computer's own sub-community has already come to agreement on a particular piece or set of suspect data (i.e. either the "warn" or "block" threshold has been passed), then it may be that the user-computer may wish to wait until one or more connected sub-communities have also made the same finding before setting the appropriate condition in its database for the data. It will be apparent that there are a multitude of possibilities as to when any particular user computer may wish to actually set an action condition for a particular piece or set of suspect data. For example, an action condition may be set for a particular piece or set of suspect data only if a user computer's own sub-community has agreed on the action in addition to a threshold number of other sub-communities, or alternatively if merely a threshold number out of the total number of sub-communities has agreed on the action regardless of the particular user computer's own sub-community's finding. Other such alternatives representing possible combinations of the logical conditions required in order to set an action condition will be apparent to the intended reader.

It is clear that such an architecture of sub-communities is analogous to a plurality of inter-connected local area networks, although it is not essential that each peer in a particular sub-community need actually be located in the same actual LAN (although this may be preferable). This is because all that defines any particular sub-community is the common cause that upon detecting suspect data a user broadcasts a message to all of its peers in the same sub-community, and hence all that is required is some message transport mechanism between peers. Such a message transport mechanism may be a single LAN to which all the peers are connected, or may be a sequence of interconnected networks such as the Internet, with different peers in a sub-community actually being part of different networks.

The modification to the second embodiment to split the user computers into sub-communities provides the additional advantage over the basic second embodiment that it, at least partially, overcomes the primary disadvantage of the high signalling bandwidth which would be required for the transmission of the warning messages to every other peer, and hence allows for scalability to add more users. As an example, consider the case where a community consists of n peers, such that when a warning message is broadcast from one of them to each of the others (n−1) individual intra-group warning messages are sent. Now, assume that in order to agree on action about a particular piece or set of data a proportion of 1/a peers have to agree i.e. the action threshold is n/a. In such a case a total of n(n−1)/a intra-group warning messages have to be transmitted in total for any one particular piece or set of data. Thus, where there are 40 peers, and half of them have to agree before action can be taken, a total of 780 warning messages would have to be transmitted (without error) before the action is agreed upon.

Now consider that the community of n peers is split equally into x sub-communities, as shown in FIG. 11. In this case, within a sub-community for any single warning from one peer a total of (n/x−1) intra-group warning messages are broadcast. Assuming that in order to agree on action about a particular piece or set of data a proportion of 1/a peers have to agree i.e. the action threshold is n/ax, then a total of $n(n-x)/ax^2$ intra-group warning messages have to be broadcast within a single sub-community for action to be agreed on a single piece of suspect data. Assuming that each sub-community has to reach agreement within itself and communicate to each other group that it has so agreed before action can be taken by any peer in any sub-community, there will still only be a total of n(n−x)/ax intra-group warning messages broadcast in total (the sum of the number of warning messages in total broadcast in each sub-community), plus x(x−1) inter-group messages between sub-communities, plus (n/x−1) further intra-group messages from the bridging peer in each sub-community to each other peer in its respective community informing them of the findings of other sub-communities (i.e. forwarding received inter-group messages onwards). Note that with respect to this latter number of intra-group messages, (n/x−1) messages are sent from a bridging peer in a sub-community for each inter-group warning message received from another sub-community, such that where full knowledge of every other sub-community's findings about a particular piece or set of suspect data is required to be disseminated throughout a particular sub-community, the total number of intra-group messages transmitted by a single bridging node forwarding on the findings of other sub-communities would be (x−1)(n/x−1). This leads to the total number of intra-group messages forwarding inter-group messages across the entire community of users of x(x−1)(n/x−1).

For example, if there are 40 peers split into 2 sub-communities of 20, then in each sub-community 190 messages are sent before action is agreed (i.e. the action threshold is reached) in each sub-community, 2 messages are exchanged between the respective bridging peers of each sub-community, one in each direction, and then the respective bridging peers each send 19 messages to inform their own peers of the finding of the other sub-community, to give a total of 420 messages. This is substantially less than the 780 messages which were required when the peers were not split into sub-communities.

It should be apparent that the above numeric examples are dependent solely on the logical conditions which were ascribed to the group operation, and in particular in the example above the need for every sub-community to agree on action about a particular piece or set of data and each issue its own inter-group warning message before any action is taken. Where slightly lower thresholds are set for action (e.g. if only half the number of sub-communities are required to agree), then the number of both inter- and intra-group warning messages which would be required to be broadcast before action is agreed would be further reduced.

In any of the embodiments of the invention described above and in other embodiments not described it should be noted that the one or more "threshold values" against which the respective counts for pieces or sets of suspect data are compared may be any value, including zero, and may be fixed or dynamically adaptive. Furthermore the actual values may be generated by any appropriate function, such as for example by a random number generator, or as a function of some metric of accuracy of users in identifying viruses. Furthermore, it is foreseen that the threshold values may not simply be actual numbers which the respective counts must be greater than, but could instead be probabilistic in nature. Furthermore, various logical functions or rules can be used for their creation, including for example, fuzzy logic. The threshold values may therefore be any values, derived by any function or method, and are not limited to the particular examples of threshold values given in the specific embodiments described herein.

As described, the present invention therefore provides a collaborative computer security system wherein a distributed decision is taken involving all or substantially all of the users of the system, to effectively allow the users to "vote" on whether or not a particular piece or set of suspect data is a threat. By providing such a distributed system the response time to a computer virus attack can be improved over the prior art case where a central authority is required to perform analysis and take action, thereby reducing the potential damage which may be caused by such an attack.

The invention claimed is:

1. A computer security system for use in a network environment comprising at least a group of user computers arranged to communicate over a network, the system comprising:

a warning message exchange system operable to allow communications from the group of user computers of warning messages relating to a piece or set of suspect data identified by one or more of the group of user computers as a possible security threat;

an identity generator operable to generate an identifier of the piece or set of suspect data;

a message counting system operable to maintain a count for every particular piece or set of suspect data based on a number of warning messages communicated over the network relating to each of the piece or set of suspect data; and a network security system operable to act in respect of any particular piece or set of suspect data when the count maintained therefor is substantially equal to or greater than at least one threshold value, wherein the threshold value is greater than one.

2. The computer security system according to claim 1, wherein a judgment as to whether any piece or set of data present at any one or more of the user computers is a possible security threat is performed by a human user or users of the any one or more user computers.

3. The computer security system according to claim 1, wherein the network security system is further operable to compare the maintained count for the particular piece or set of suspect data against a plurality of different thresholds, and to take different action based on each of the plurality of thresholds that is met.

4. The computer security system according to claim 1, wherein the action taken by the network security system, when the maintained count is substantially equal to or greater than the at least one threshold value, comprises sending a warning to each of the group of user computers as to the suspect nature of the particular piece or set of suspect data.

5. The computer security system according to claim 1, wherein the action taken by the network security system, when the maintained count is substantially equal to or greater than the at least one threshold value, comprises preventing a transmission of the particular piece or set of suspect data across the network.

6. The computer security system according to claim 1, wherein each warning message comprises at least the identifier of the piece or set of suspect data to which it relates.

7. The computer security system according to claim 6, wherein the identifier is the piece or set of suspect data itself.

8. The computer security system according to claim 6, wherein the identifier is a repeatably generatable signature substantially unique to the piece or set of suspect data.

9. The computer security system according to claim 1, and further comprising
a network server arranged to receive each warning message communicated from the group of user computers, and further arranged to host the message counting system and at least a part of the network security system,
wherein that part of the network security system hosted by the server is operable to determine the action which should be taken against the particular piece or set of suspect data, and to communicate an action condition indicator indicative of the determined action to each of the group of user computers.

10. The computer security system according to claim 1, wherein
a warning message generated by a user computer of the group is broadcast to every other user computer of the group, and
each user computer of the group is further arranged to host its own message counting system and network security system operable in accordance with claim 1.

11. The computer security system according to claim 1, wherein the group of user computers is a first group of computer users, the computer security system further comprising:
an inter-group communications system operable to allow the communication of inter-group warning messages relating to the piece or set of suspect data identified as a possible security threat from the first group of user computers to one or more other groups of other user computers.

12. The computer security system according to claim 11, wherein the inter-group warning messages are transmitted by the inter-group communications system when the number of warning messages communicated by the user computers in the first group concerning the particular piece or set of data is equal to or greater than at least one inter-group threshold value.

13. The computer security system according to claim 12, wherein each of the at least one inter-group threshold value is the same as each corresponding value of the at least one threshold value at which the network security system takes action.

14. The computer security system according to claim 11, wherein the inter-group communications system is further arranged to receive inter-group warning messages from the one or more other groups of other user computers.

15. The computer security system according to claim 14, further comprising:
a second message counting system operable to maintain a count for every particular piece or set of suspect data based on the number of inter-group warning messages communicated relating thereto,
wherein the network security system is further operable to act against any particular piece or set of suspect data for which the count maintained therefor by the second message counting system is substantially equal to or greater than at least one inter-group threshold value.

16. The computer security system according to claim 15, wherein the network security system is further arranged to act against the particular piece or set of suspect data only if both the respective counts maintained by the message counting system and the second message counting system are substantially equal to or greater than at least the at least one threshold value and the at least one inter-group threshold value respectively.

17. A computer security system for use in a network environment comprising at least a group of user computers arranged to communicate over a network, the system comprising:
a warning message exchange system operable to allow communications from the group of user computers of warning messages relating to a piece or set of suspect data identified by one or more of the group of user computers as a possible security threat;
an identity generator operable to generate an identifier of the piece or set of suspect data;
a message counting system operable to maintain a count for every particular piece or set of suspect data based on a number of warning messages communicated relating to each of the piece or set of suspect data; and
a network security system operable to act in respect of any particular piece or set of suspect data when the count maintained therefor is substantially equal to or greater than at least one threshold value;
wherein the message counting system is further arranged to store one or more weighting coefficients relating to one or more particular user computers of the group, and to increment the count maintained for the particular piece or set of suspect data by an amount based upon the weighting coefficient when the warning message is received from the one or more particular user computers of the group relating to the particular piece or set of suspect data.

18. A computer readable storage medium storing one or more computer programs which when run on a computer causes the computer to operate in the manner of a system according to claim 1.

19. A method of providing computer security in a network environment comprising at least a group of user computers arranged to communicate over a network, the method comprising:
communicating, from one or more user computers of the group, warning messages relating to a piece or set of suspect data identified by one or more of the group of user computers as a possible security threat;
generating an identifier of the piece or set of suspect data;
maintaining a count for every piece or set of suspect data based on a number of warning messages communicated over the network relating thereto; and acting in respect of any particular piece or set of suspect data when the count maintained therefor is substantially equal to or greater than at least one threshold value, wherein each threshold value is greater than one.

20. A method to be performed by a server connected a network, wherein the server is configured to serve a group of user computers also connected to the network, the method comprising:
  receiving an individual warning message from a user computer of the group regarding a suspect data, wherein the suspect data is identified by the user computer as a possible security threat by the user computer;
  verifying whether the suspect data is a security threat; and
  broadcasting a group warning message to all user computers of the group regarding the suspect data when the suspect data is identified as being a security threat.

21. The method of claim 20,
  wherein the group warning message includes an action indicator, and
  wherein the action indicator indicates to the user computers of an action to take by the user computers when the suspect data is encountered.

22. The method of claim 21,
  wherein the action indicator includes a block action indicator and a warning action indicator,
  wherein the block action indicator indicates to the user computers that when the suspect data is encountered, the suspect data should be deleted from the user computer or should be prevented from being downloaded onto the user computer, and
  wherein the warning action indicator indicates to the user computers that when the suspect data is encountered, a user of the user computer should be notified.

23. The method of claim 21, further comprising:
  maintaining a count of individual warning messages received from the user computers of the group regarding the suspect data;
  determining whether the count of the individual warning messages regarding the suspect data reaches above a preset threshold for the action indicator; and
  broadcasting the group message with the action indicator only when the count of the individual warning messages regarding the suspect data reaches above the preset threshold for the action indicator,
  wherein the preset threshold for the action indicator is greater than one.

24. The method of claim 23,
  wherein the action indicator is one of at least a block action indicator and a warning action indicator,
  wherein the block action indicator indicates to the user computers that when the suspect data is encountered, the suspect data should be deleted from the user computer or should be prevented from being downloaded onto the user computer,
  wherein the warning action indicator indicates to the user computers that when the suspect data is encountered, a user of the user computer should be notified,
  wherein the block action indicator is included in the group warning message when the count of the individual warning messages regarding the suspect data is at or above a block count threshold,
  wherein the warning action indicator is included in the group warning message when the count of the individual warning messages regarding the suspect data is at or above a warning count threshold, and
  wherein the block count threshold is greater than the warning count threshold.

25. A method to be performed by a server connected a network, wherein the server is configured to serve a group of user computers also connected to the network, the method comprising:
  receiving an individual warning message from a user computer of the group regarding a suspect data, wherein the suspect data is identified by the user computer as a possible security threat by the user computer;
  verifying whether the suspect data is a security threat; and
  broadcasting a group warning message to all user computers of the group regarding the suspect data when the suspect data is identified as being a security threat;
  wherein the group warning message includes an action indicator, and
  wherein the action indicator indicates to the user computers of an action to take by the user computers when the suspect data is encountered;
  wherein the method further comprises:
  maintaining a count of individual warning messages received from the user computers of the group regarding the suspect data;
  determining whether the count of the individual warning messages regarding the suspect data reaches above a preset threshold for the action indicator;
  broadcasting the group message with the action indicator only when the count of the individual warning messages regarding the suspect data reaches above the preset threshold for the action indicator, wherein the preset threshold for the action indicator is greater than one;
  maintaining a weight factor for a user using the group of user computers; and
  adjusting the count of the individual warning messages regarding the suspect data based on the weight factor of the user using the user computer when the individual warning message is received from the user computer.

26. The method of claim 25, further comprising adjusting the weight factor for the user based on an accuracy of the user in identifying possible security threats.

27. A method to be performed by a user computer of a group of user computers connected a network, the method comprising:
  identifying if a suspect data is encountered, wherein the suspect data is data identified by one or more of the group of user computers as being a possible security threat;
  maintaining an encounter count of the suspect data encountered by the group of user computers; and
  broadcasting a peer group warning message to all other user computers of the group regarding the suspect data, wherein the peer group warning message includes the encounter count.

28. The method of claim 27, further comprising:
  determining whether the encounter count of the suspect data is at or above one or more preset thresholds; and
  setting an action condition corresponding to each of the one or more preset thresholds when the encounter count of the suspect data is at or above the one or more preset thresholds,
  wherein each of the one or more preset thresholds is greater than one.

29. The method of claim 28, wherein the action condition includes a block condition and a warning condition, the method further comprising:
  when the block condition is set, deleting the suspect data from the user computer or preventing the suspect data from being downloaded onto the user computer when the suspect data is encountered again; and when the warning condition is set, notifying a user of the user computer regarding the suspect data when the suspect data is encountered again.

30. The method of claim 29, wherein the preset threshold for the block condition is greater than the preset threshold for the warning condition.

31. The method of claim 27, wherein the suspect data is identified by a user using the user computer.

32. A method to be performed by a user computer of a group of user computers connected a network, the method comprising:
  identifying if a suspect data is encountered, wherein the suspect data is data identified by one or more of the group of user computers as being a possible security threat;
  maintaining an encounter count of the suspect data encountered by the group of user computers;
  broadcasting a peer group warning message to all other user computers of the group regarding the suspect data, wherein the peer group warning message includes the encounter count, and the suspect data is identified by a user using the user computer;
  maintaining a weight factor for the user using the user computer; and
  adjusting the encounter count of the suspect data based on the weight factor of the user using the user computer.

33. The method of claim 32, further comprising adjusting the weight factor for the user based on an accuracy of the user in identifying possible security threats.

34. The method according to claim 19, wherein a judgment as to whether any piece or set of data present at any one or more of the group of user computers is a possible security threat is performed by a human user or users of the any one or more the group of user computers.

35. The method according to claim 19, further comprising comparing the maintained count for the particular piece or set of suspect data against a plurality of different thresholds, and taking different action based on each of the plurality of thresholds that is met.

36. The method according to claim 19, wherein the acting when the maintained count is substantially equal to or greater than at least one threshold value comprises sending a warning to each of the group of user computers as to the suspect nature of the particular piece or set of suspect data.

37. The method according to claim 19, wherein the acting when the maintained count is substantially equal to or greater than at least one threshold value comprises preventing a transmission of the particular piece or set of suspect data across the network.

* * * * *